(12) United States Patent
Benenson, Jr. et al.

(10) Patent No.: US 6,666,976 B2
(45) Date of Patent: Dec. 23, 2003

(54) SELF CLEANING WATER FILTER

(76) Inventors: James Benenson, Jr., 1 Lexington Ave., New York, NY (US) 10010; David A. Laing, 217 Northfield Dr., Elyria, OH (US) 44035

( * ) Notice: Subject to any disclaimer, the term of this patent is extended or adjusted under 35 U.S.C. 154(b) by 0 days.

(21) Appl. No.: 10/341,169

(22) Filed: Jan. 13, 2003

(65) Prior Publication Data

US 2003/0098273 A1 May 29, 2003

Related U.S. Application Data

(60) Division of application No. 09/873,526, filed on Jun. 4, 2001, which is a continuation-in-part of application No. 09/737,411, filed on Dec. 15, 2000, now Pat. No. 6,517,722, which is a continuation-in-part of application No. 09/417,404, filed on Oct. 13, 1999, now Pat. No. 6,177,022, which is a continuation-in-part of application No. 09/014,447, filed on Jan. 28, 1998, now abandoned.

(51) Int. Cl.$^7$ .................. B01D 33/073; B01D 33/46; B01D 33/50
(52) U.S. Cl. .................. 210/784; 210/393; 210/397; 210/398; 210/402; 210/408; 210/411; 210/791
(58) Field of Search .................. 210/391, 393, 210/396, 397, 398, 402, 407, 408, 409, 411, 784, 791

(56) References Cited

U.S. PATENT DOCUMENTS

| | | |
|---|---|---|
| 148,557 A | 3/1874 | Gillespie et al. |
| 556,725 A | 3/1896 | Farwell |
| 719,913 A | 2/1903 | Wackerow |
| 740,574 A | 10/1903 | Kohlmeyer |
| 748,821 A | 1/1904 | Wackerow |
| 793,720 A | 7/1905 | Godbe |
| 810,020 A | 1/1906 | Applegate |
| 1,012,974 A | 12/1911 | Bird |
| 1,140,720 A | 5/1915 | Simons |
| 1,914,742 A | 6/1933 | Hillier |
| 1,977,601 A | 10/1934 | Winton |
| 1,993,214 A | 3/1935 | Hass |
| 2,056,891 A | 10/1936 | Pecker |

(List continued on next page.)

FOREIGN PATENT DOCUMENTS

| | | |
|---|---|---|
| CH | 22 863 | 12/1900 |
| DE | 462 348 | 7/1928 |
| DE | 1 188 558 | 3/1965 |

(List continued on next page.)

*Primary Examiner*—Matthew O. Savage
(74) *Attorney, Agent, or Firm*—Caesar, Rivise, Bernstein, Cohen & Pokotilow, Ltd.

(57) ABSTRACT

A self-cleaning water filter, coupled to a water flow having particulates therein, that includes a pair of canisters, each having a cylindrical wedge wire water filter screen. An elongated brush running the length of the screen is disposed between two confining walls also running the length of the screen to form a chamber. A elongated partition, including two sets of apertures, is used, along with the elongated brush, to divide the chamber into two particulate dislodge chambers and a drain subchamber. A drain is in fluid communication with the drain subchamber. During cleaning, the drain is opened and the screen is rotated against the brush for liberating the particulate contaminants and a limited amount of the water flow into the two dislodge subchambers. The particulate contaminants and the limited amount of water then pass through the apertures at a high velocity and into the drain subchamber which exits through the drain. Alternatively, a reverse flow of clean water can be used in combination with the elongated brush, for dislodging the particulate contaminants from the water filter. Finally, another variation of using a reverse flow of water for cleaning purposes is discussed whereby a stationary water filter is disposed in a system that isolates the water filter from the normal water flow during cleaning.

24 Claims, 16 Drawing Sheets

U.S. PATENT DOCUMENTS

| | | |
|---|---|---|
| 2,066,479 A | 1/1937 | MacIsaac |
| 2,243,559 A | 5/1941 | Griffith |
| 2,275,958 A | 3/1942 | Hagel |
| 2,354,752 A | 8/1944 | Hellan |
| 2,365,766 A | 12/1944 | Levier |
| 2,393,150 A | 1/1946 | Dayton |
| 2,549,363 A | 4/1951 | Blickman |
| 2,834,474 A | 5/1958 | Jalkanen |
| 3,112,263 A | 11/1963 | Ellilia |
| 3,161,159 A | 12/1964 | Kritske |
| 3,256,995 A | 6/1966 | Schmid et al. |
| 3,278,038 A | 10/1966 | Acker |
| 3,286,843 A | 11/1966 | Kraissel, Jr. |
| 3,333,700 A | 8/1967 | Coleman |
| 3,334,747 A | 8/1967 | Niccum et al. |
| 3,338,416 A | 8/1967 | Barry |
| 3,363,771 A | 1/1968 | Walters |
| 3,414,129 A | 12/1968 | Going et al. |
| 3,574,509 A | 4/1971 | Zentis et al. |
| 3,622,006 A | 11/1971 | Brunner |
| 3,647,071 A | 3/1972 | Lamort |
| 3,688,337 A | 9/1972 | Noda |
| 3,692,178 A | 9/1972 | Reece |
| 3,747,770 A | 7/1973 | Zentis |
| 3,870,640 A | 3/1975 | Reece |
| 4,052,305 A | 10/1977 | Arvanitakis |
| 4,113,618 A | 9/1978 | Koseki et al. |
| 4,226,716 A | 10/1980 | White, Jr. |
| 4,253,962 A | 3/1981 | Thompson |
| 4,255,264 A | 3/1981 | Madsen |
| 4,279,760 A | 7/1981 | Yamamoto |
| 4,346,011 A | 8/1982 | Brownstein |
| 4,347,134 A | 8/1982 | Svehaug |
| 4,582,603 A | 4/1986 | Nasse |
| 4,610,786 A | 9/1986 | Pearson |
| 4,642,188 A | 2/1987 | DeVisser et al. |
| 4,655,937 A | 4/1987 | Hendrix |
| 4,735,730 A | 4/1988 | Bratten |
| 4,818,402 A | 4/1989 | Steiner et al. |
| 4,822,486 A | 4/1989 | Wilkins et al. |
| 4,836,922 A | 6/1989 | Rishel et al. |
| 4,849,105 A | 7/1989 | Borchert |
| 4,867,879 A | 9/1989 | Müller |
| 4,902,410 A | 2/1990 | Botsch |
| 4,904,397 A | 2/1990 | Eimer et al. |
| 4,957,630 A | 9/1990 | Bratten |
| 5,055,205 A | 10/1991 | White |
| 5,059,331 A | 10/1991 | Goyal |
| 5,076,115 A | 12/1991 | DeWachter et al. |
| 5,084,176 A | 1/1992 | Davis et al. |
| 5,102,534 A | 4/1992 | Gabet |
| 5,152,891 A | 10/1992 | Netkowicz et al. |
| 5,160,428 A | 11/1992 | Kuri |
| 5,194,160 A | 3/1993 | Simonelli et al. |
| 5,198,111 A | 3/1993 | Davis |
| 5,217,613 A | 6/1993 | Tashiro et al. |
| 5,227,064 A | 7/1993 | Strid |
| 5,262,069 A | 11/1993 | Kato |
| 5,275,728 A | 1/1994 | Koller |
| 5,298,161 A | 3/1994 | Sieg |
| 5,332,499 A | 7/1994 | Spencer |
| 5,423,977 A | 6/1995 | Aoki et al. |
| 5,527,462 A | 6/1996 | Davis et al. |
| 5,569,383 A | 10/1996 | Vander Ark et al. |
| 5,595,655 A | 1/1997 | Steiner et al. |
| RE35,560 E | 7/1997 | Simonelli et al. |
| 5,723,051 A | 3/1998 | Bartelt et al. |
| 5,772,867 A | 6/1998 | Chiang et al. |
| 6,177,022 B1 | 1/2001 | Benenson, Jr. |
| 6,251,294 B1 | 6/2001 | Davis et al. |
| 6,395,186 B1 | 5/2002 | De Kock et al. |

FOREIGN PATENT DOCUMENTS

| | | |
|---|---|---|
| DE | 3640 638 C1 | 5/1988 |
| DE | 3829 360 A1 | 8/1988 |
| DE | 4118423 | 9/1992 |
| DE | 41 18 423 | 9/1992 |
| DE | 42 26 445 | 2/1994 |
| DE | 19844310 | 3/2000 |
| DE | 198 44 310 | 3/2000 |
| EP | 0 049 746 | 4/1982 |
| EP | 0225 401 A1 | 6/1987 |
| EP | 0 688 593 | 12/1995 |
| EP | 0 858 824 | 8/1998 |
| EP | 0 919 279 | 6/1999 |
| FI | 103325 | 6/1999 |
| GB | 2 048 098 A | 12/1979 |
| GB | 2 048 098 | 12/1980 |
| GB | 2 067 910 | 8/1981 |
| GB | 2 159 725 | 12/1985 |
| GB | 2371246 | 7/2002 |
| GB | 2 375 972 | 12/2002 |
| JP | 8281021 | 10/1996 |
| WO | WO 9112870 | 10/1994 |
| WO | WO 01/26775 | 4/2001 |

SELF CLEANING WATER FILTER

RELATED APPLICATIONS

This application is a divisional application of Ser. No. 09/873,526 filed on Jun. 4, 2001, entitled SELF-CLEANING WATER FILTER, pending, which in turn is a Continuation-in-Part of application Ser. No. 09/737,411 filed on Dec. 15, 2000, now U.S. Pat. No. 6,517,722, which is a Continuation-in-Part of application Ser. No. 09/417,404, filed on Oct. 13, 1999, now U.S. Pat. No. 6,177,022, which is a Continuation-in-Part of Co-Pending application Ser. No. 09/014,447 filed Jan. 28, 1998, now abandoned, the latter three of which are entitled SELF-CLEANING FUEL OIL STRAINER, and all of whose entire disclosures are incorporated by reference herein.

BACKGROUND OF THE INVENTION

This invention relates generally to filter devices and, more particularly, to water system filters for small particulate contaminants.

It is well-known that the mechanical cleaning of a filter surface can be accomplished by having a brush or scraper drag along the filter surface where deposits have accumulated. In certain configurations, the brush or scraper is mounted at one end between two walls but with a significant portion of the brush or scraper projecting beyond the walls. Such configurations are shown in U.S. Pat. Nos. 148,557 (Gillespie et al.); 556,725 (Farwell); 740,574 (Kohlmeyer) and 793,720 (Godbe). In conventional filter systems, the particulate contaminants are driven off the filter surface and are deposited in a hopper or tank along with the fluid being filtered, thus discarding large amounts of the fluid being filtered.

The use of a brush, or high speed cleaning spray, disposed between a pair of walls for cleaning a cylindrical filter is known in the art, as is disclosed in U.S. Pat. Nos. 5,423,977 (Aoki et al.) and 5,595,655 (Steiner et al.) and Swiss Patent No. 22,863 (Zingg). Another variation employs a backwash that drives the particulate contaminants off of the cylindrical filter, as is disclosed in U.S. Pat. No. 3,338,416 (Barry).

An exemplary use of such filters is in a water desalination system that is available on ships. Shipboard water/salt water straining is a specialized straining process. In particular, the water/salt water flow is initially pre-strained for gross particulate contaminants, such that any particulate contaminants remaining in the water/salt water flow are extremely small (e.g., <100 microns, with a large percentage being less than 25 microns). As a result, where these small particulate contaminants are captured by a downstream strainer (e.g., a wedge wire screen strainer), both on and within the strainer surface, and then later dislodged during the strainer cleaning process, these extremely small particulate contaminants do not fall by gravity toward a drain but remain suspended in the water/salt water and will re-attach to the strainer surface. Therefore, there remains a need for a cleaning device that can dislodge such extremely small particulate contaminants off of the downstream strainer surface, as well as from within the strainer surface, and then ensure that these particulate contaminants flow out through the drain rather than re-attaching to the strainer surface.

Thus, there is a need for an improved system for removing undesired particulate contaminants from a water/salt water flow and without interrupting that water/salt water flow to the engines, while minimizing the amount of fluid removed therewith. It is to just such a system that the present invention is directed.

SUMMARY OF THE INVENTION

A water cleaning system is disposed within a water flow having particulate contaminants therein. As mentioned earlier, the particulate contaminants that need to be removed from the water flow are extremely small, less than 100 microns, and a large percentage of these less than 25 microns, therefore do not settle out by gravity. The invention of the present application is well-suited to removing these small particulate contaminants from the water flow and into a drain.

In particular, a water filter is disposed within a water flow having particulate contaminants therein. The water filter comprises: a porous member in fluid communication with the water flow such that the water flow enters the porous member through a first porous member surface and exits through a second porous member surface and wherein the water flow deposits the particulate contaminants on the first porous member surface; particulate-removing means disposed to be in close proximity with the porous member for removing particulate contaminants from the first porous member surface along substantially the entirety of the length of the first porous member surface; a pair of flow confining walls are disposed to be in close proximity with the first porous member surface along substantially the entirety of the length of the first porous member surface for defining a chamber; a partition divides the chamber into a first subchamber and a second subchamber along the length of the chamber; a drive mechanism is provided for displacing the porous member for continuously directing particulate contaminants deposited on the first porous surface past the particulate removing means for continuously dislodging the particulate contaminants from the first porous member surface into the first subchamber; the partition includes first and second portions on opposite sides of the particulate removing means and each portion has a plurality of apertures for passing the dislodged particulate contaminants from the first subchamber into the second subchamber; and drain is in communication with the second subchamber and through which the dislodged particulate contaminants are removed when the drain is opened.

A method is provided for cleaning a water flow having particulate contaminants therein. The method comprises the steps of: disposing a porous member in fluid communication with the water flow such that the water flow enters the porous member through a first porous member surface and exits through a second porous member surface so that the water flow deposits the particulate contaminants on the first porous member surface; positioning a pair of flow confining walls adjacent the first porous member surface to define a chamber and positioning a respective flexible member between a respective flow confining wall and the first porous surface member, and wherein the respective flexible members are in contact with the first porous surface; positioning a particulate-removing means closely-adjacent the porous member; dividing the chamber into first and second subchambers with a partition having first and second portions on opposite sides of the particulate removing means and each portion having a plurality of apertures to provide fluid communication between the first and second subchambers and wherein the second subchamber is in fluid communication with a drain when the drain is opened; displacing the porous member to permit the particulate-removing means to dislodge particulate contaminants trapped on the first porous member surface into the first subchamber; and opening the drain to cause the dislodged particulate contaminants to pass through the plurality of apertures into the second subchamber and out into the drain.

A water cleaning system is provided for use with a water flow having particulate contaminants therein. The cleaning system comprises: an inlet valve for controlling the water flow having particulate contaminants therein forming a contaminated water flow and wherein the contaminated water flow flows through a first output port of the inlet valve; a stationary porous member positioned in the contaminated water flow that passes through the first output port and wherein the contaminated water flow enters the stationary porous member through a first porous member surface and exits through a second porous member surface towards a second output port, and wherein the contaminated water flow deposits the particulate contaminants on the first porous member surface to form a clean water flow that flows toward the second output port; an outlet valve coupled to the second output port for controlling the clean water flow; a flow control means, operated during a porous member cleaning process, having a flow control means input coupled to a source of water and a flow control means output coupled to the second output port and wherein the flow control means controls a reverse flow of the clean water that flows from the second porous member surface through the first porous member surface for dislodging the particulate contaminants from the first porous member surface to form a contaminated reverse flow of water; a drain valve coupled to the first output port for directing the contaminated reverse flow of water towards a drain during the cleaning process; and the inlet valve and outlet valve are closed during the cleaning process.

A method is provided for cleaning a contaminated water flow having particulate contaminants therein. The method comprises the steps of: positioning a stationary porous member in the contaminated water flow such that the contaminated water flow enters the stationary porous member through a first porous member surface and exits through a second porous member surface toward an output port, and wherein the contaminated water flow deposits the particulate contaminants on the first porous member surface; isolating the stationary porous member from the contaminated water flow during a cleaning process; passing a reverse flow of clean water from the output port and through the stationary porous member from the second porous surface member surface to the first porous member surface for dislodging the particulate contaminants from the first porous member surface to form a contaminated reverse flow of water; opening a drain to receive the contaminated reverse flow of water; discontinuing the reverse flow of clean water while closing the drain to complete the cleaning process; and recoupling the stationary porous member to the contaminated water flow.

A water filter system for use with a water flow having particulate contaminants therein. The water filter system comprises: an inlet valve for controlling the water flow having particulate contaminants therein forming a contaminated water flow and wherein the contaminated water flows through a first output port of the inlet valve; a stationary porous member positioned in the contaminated water flow that passes through the first output port, and wherein the contaminated water flow enters the stationary porous member through a first porous member surface and exiting through a second porous member surface towards a second output port, and wherein the water flow deposits the particulate contaminants on the first porous member surface to form a clean water flow that flows towards the second output port; a third output port coupled to a drain through a drain valve; the inlet valve being closed while the drain valve is opened during a cleaning process for generating a reverse flow of the water that flows from the second output port towards the third output port, wherein the reverse flow of the clean water flows through the stationary porous member from the second porous member surface through the first porous member surface for dislodging the particulate contaminants from the first porous member surface to form a contaminated reverse flow of water that flows into the drain; and the drain valve being closed and the inlet valve being opened after the cleaning process is completed.

DESCRIPTION OF THE DRAWINGS

Many of the intended advantages of this invention will be readily appreciated when the same becomes better understood by reference to the following detailed description when considered in connection with the accompanying drawings wherein.

DETAILED DESCRIPTION OF THE PREFERRED EMBODIMENTS

The following is a detailed description of the present invention. The present invention has wide application where straining very small particulate contaminants, less than 100 microns and large percentage of these are less than 25 microns, from a water/salt water flow is required, and is not limited to the environment shown in FIG. 1, as will be discussed in detail below. The present invention is characterized as a non-disposable cleaning device, i.e., having a porous member that can be cleaned rather than being thrown away. The term non-disposable is defined as an item that does not require periodic replacement, e.g., once a day, week or month. Thus, such a non-disposable item has obvious advantages in environments where storage is limited and cleaning device replenishment facilities are unavailable, e.g., ocean-going vessels. Other example systems include power plants, cogeneration facilities, etc.

As an exemplary environment, Applicants have depicted a water desalination system 1 for disclosing the preferred embodiment; such a water desalination system 1 may be used on watercraft, e.g., ships and boats. However, it should be understood that it is within the broadest scope of the present invention that it can be used in any water cleaning system and it is not limited to a water desalination system.

Figure 1:
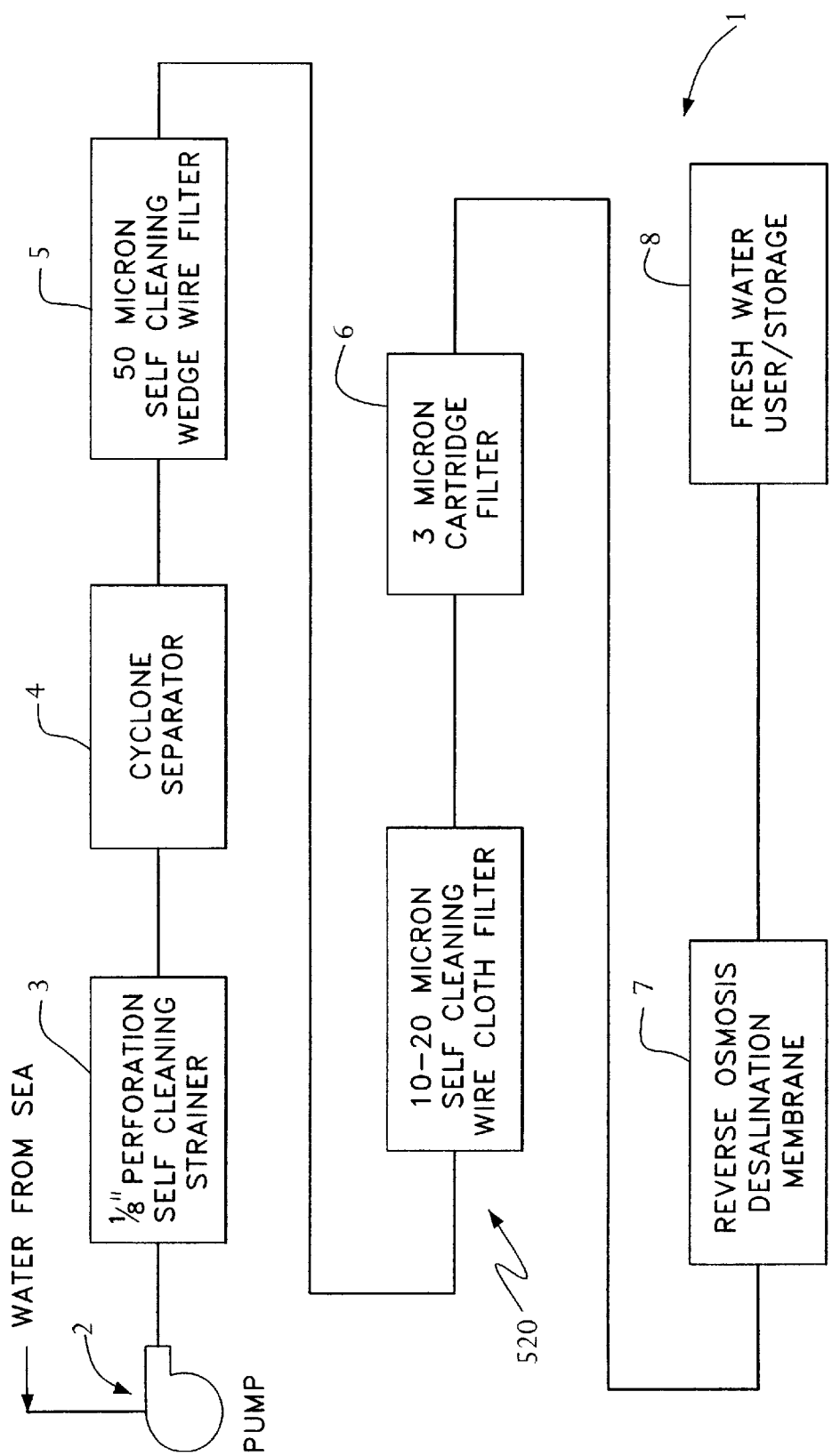
FIG. 1 is a block diagram of the water-desalination system in which the present invention is located.

Referring now in greater detail to the various figures of the drawing, wherein like reference characters refer to like parts, there is shown in FIG. 1 at 520 a self-cleaning water filter of the present invention which forms a part of the system 1. The water filter system 1 comprises five stages of straining/filtration followed by a reverse osmosis stage 6. A pump 2 pumps sea water into a ⅛" perforation self cleaning strainer 3 which discharges to a cyclone separator 4 (also referred to in the art as a "centrifugal separator"), which discharges to a 50 micron self cleaning wedge wire filter 5. The wedge wire filter 5 discharges to the self-cleaning wire cloth (e.g., 10–20 micron) water filter 520 which, in turn, discharges to a 3 micron cartridge filter 6 and finally through the reverse osmosis membrane 7 to a fresh water user/storage stage 8.

Figure 2:
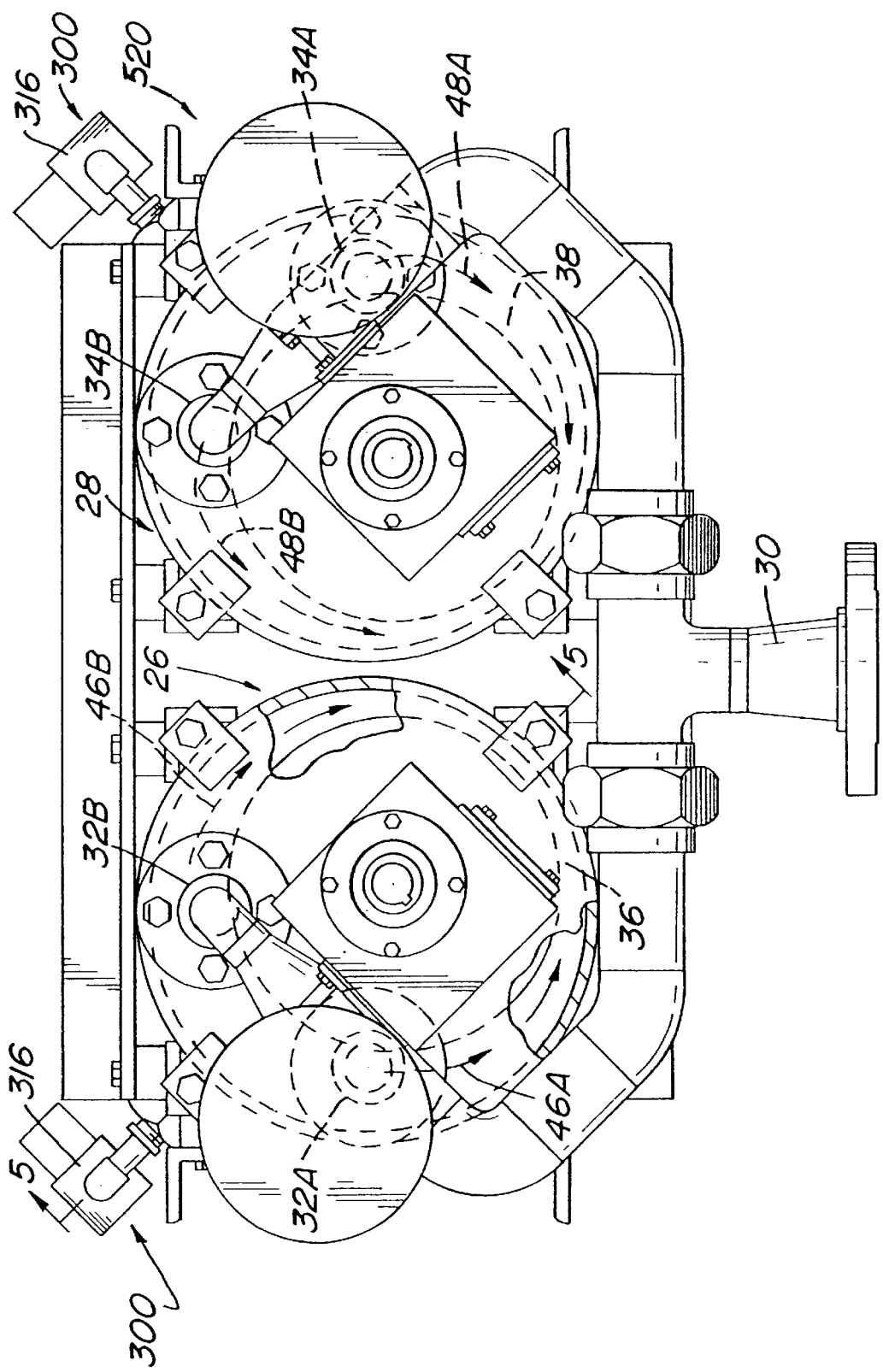
FIG. 2 is a top view of the present invention.

As shown more clearly in FIG. 2, the water filter 520 comprises two canisters 26 and 28 that are fed the main water flow with particulates, e.g., the sea water, from the wedge wire filter 5 via a common input manifold 30 (e.g., 2½ inch class 150 ANSI flanged input) at the top portion of the filter 520. Each canister 26 and 28 has two inputs from the common manifold 30, as indicated by inputs 32A and 32B for canister 26 and by inputs 34A and 34B for canister 28. Each canister 26 and 28 comprises a cylindrical-shaped porous member 36 and 38, respectively, through which the sea water flows, as will be discussed in detail later. The porous members 36 and 38 comprise a screen selected from the group consisting of wedge wire, wire cloth and perforated metal. In the preferred embodiment, the porous members 36 and 38 comprise wedge wire screens, such as those manufactured by Leem Filtration Products, Inc. of Mahwah, N.J. It is also within the broadest scope of the present invention that the porous members 36 and 38 may comprise wire cloth or perforated metal, as opposed to wedge wire screens. One of the main features of the water filter 520 is its ability to filter out fine particulate matter, e.g., particulates less than 100 microns, where a large percentage of these are less than 25 microns.

Figure 3:
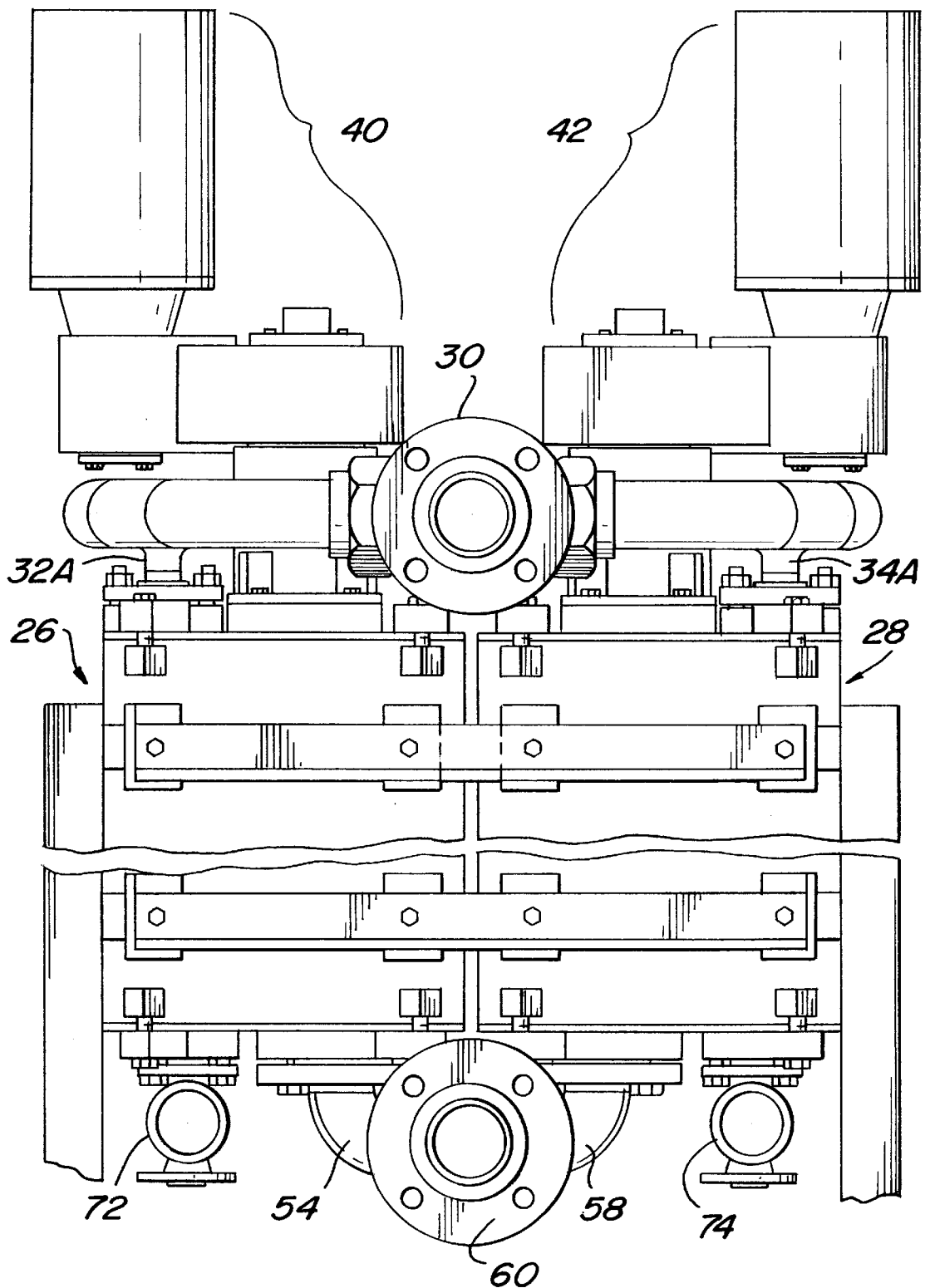
FIG. 3 is a partial side view of the present invention.
Figure 5:
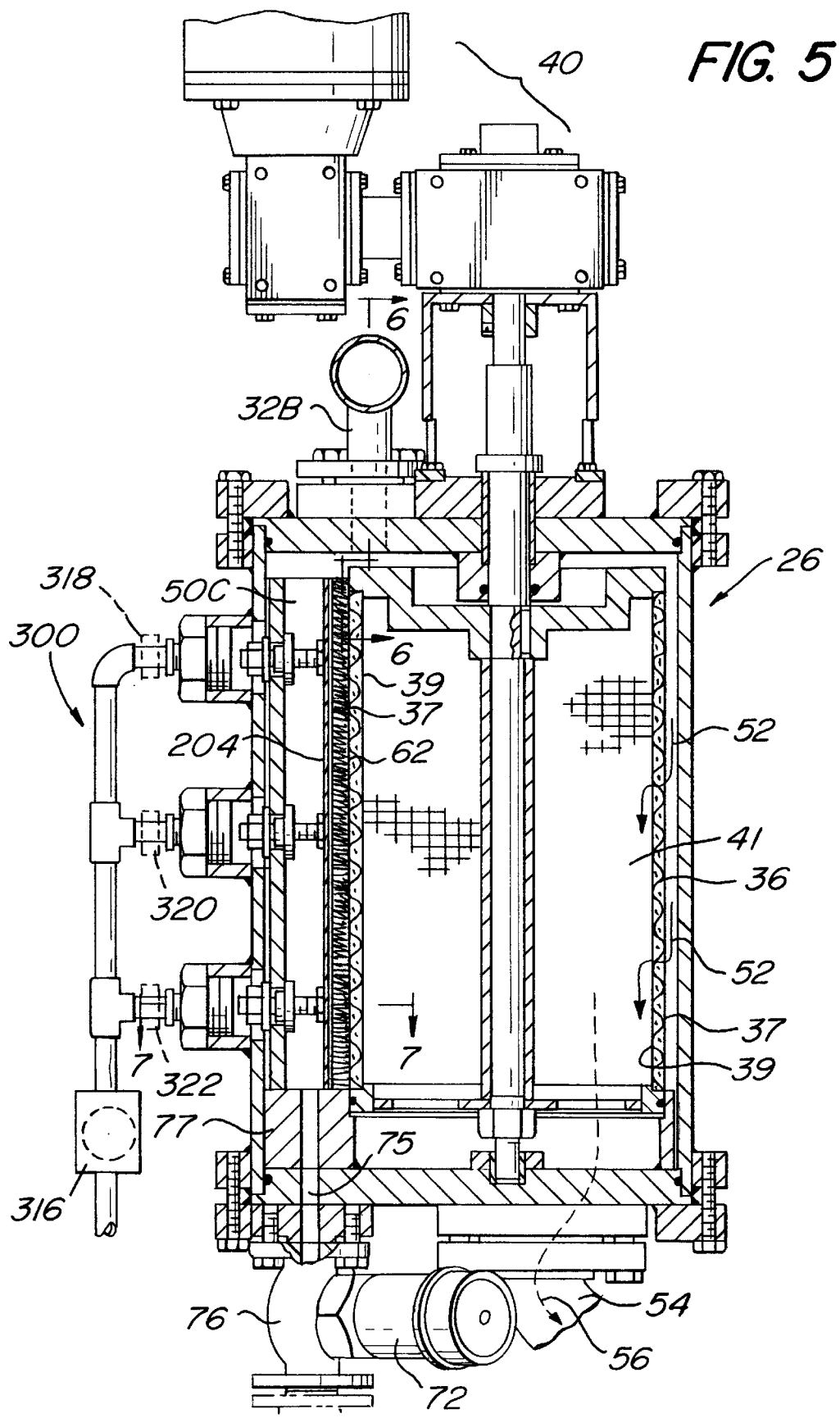
FIG. 5 is a cross-sectional view of the present invention taken along line 5—5 of FIG. 2.
Figure 6:
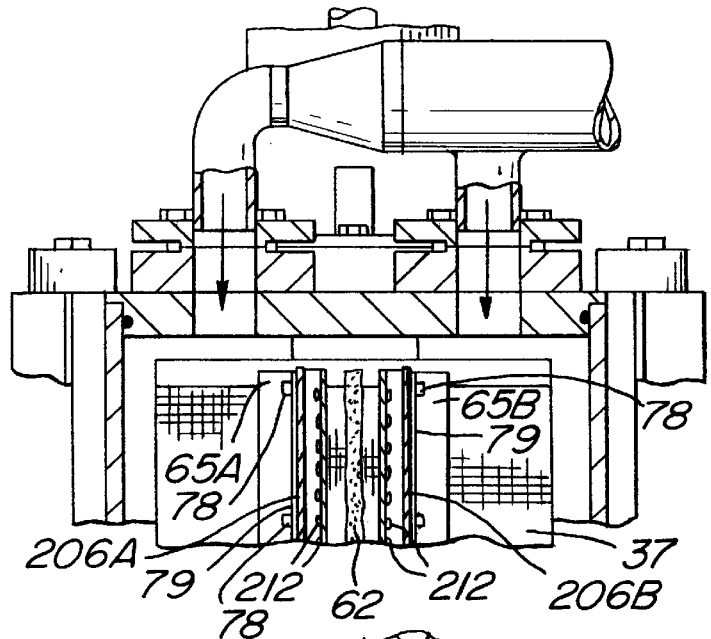
FIG. 6 is partial sectional view taken along line 6—6 of FIG. 5.

Drive mechanisms 40 and 42 (FIG. 3) are provided to rotate the respective porous members 36 and 38 during the cleaning process about their respective center axes, only one (44) of which is clearly shown in FIG. 5. Otherwise, during normal operation, the porous members 36 and 38 remain stationary.

As can be seen in FIG. 2, sea water enters each canister through its respective inputs and then flows around the periphery of each porous member 36 and 38; in particular, sea water flow from inputs 32A and 32B are shown by arrows 46A and 46B, respectively, and sea water flow from inputs 34A and 34B are shown by arrows 48A and 48B, respectively. The inputs 32A and 32B are located on both sides of an internal particulate chamber 50 (FIG. 7, which comprises two dislodge subchambers 50A/50B and a drain subchamber 50C, all of which are discussed later) in canister 26; similarly, although not shown, the inputs 34A and 34B in canister 28 are also located on both sides of a internal particulate chamber, also comprising two dislodge subchambers and a drain subchamber. Thus, water/salt water input flow moves away from the chamber 50 and around the periphery of the porous members 36 and 38 and then through them, as is discussed next.

Figure 4:
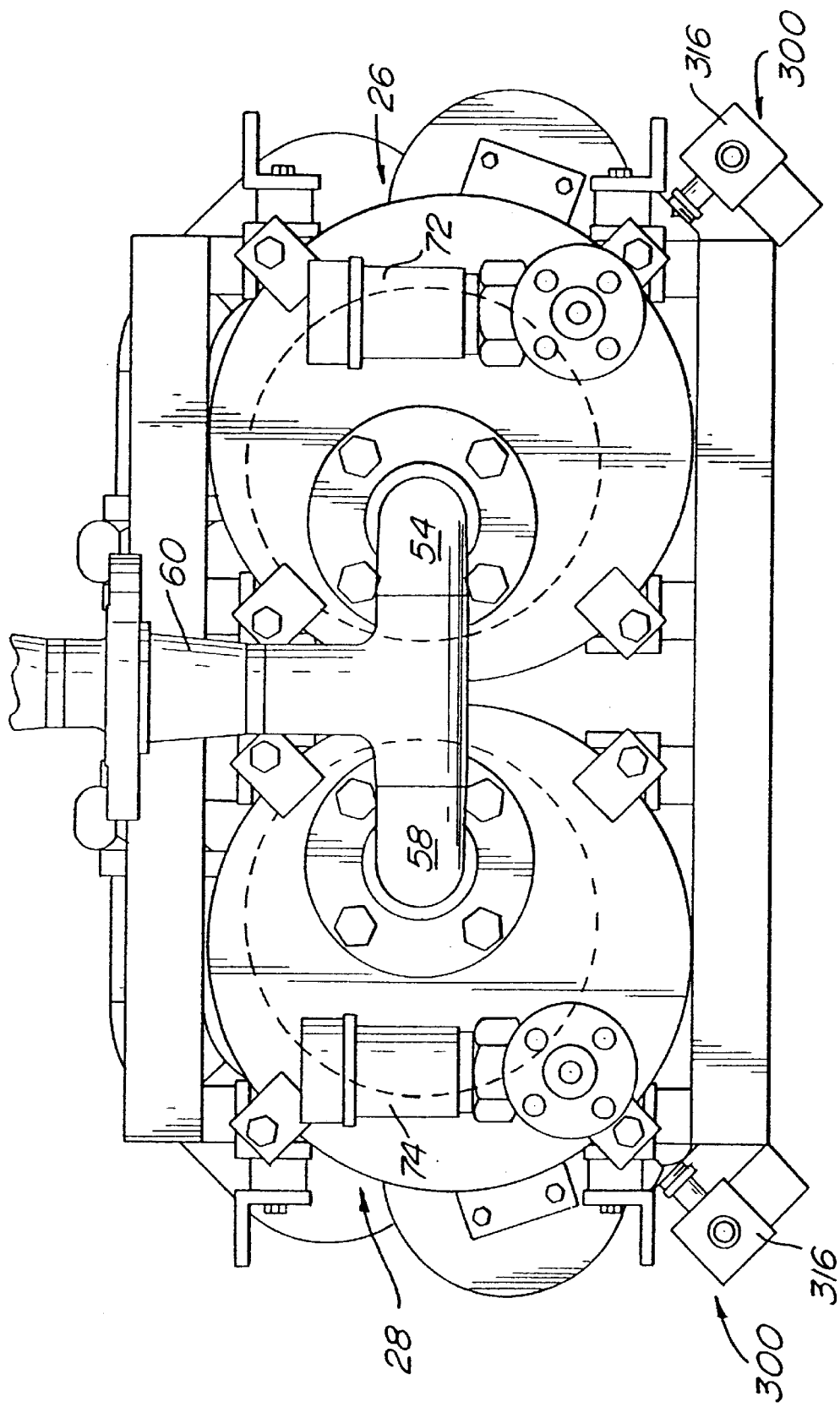
FIG. 4 is a bottom view of the present invention.

Sea water flow through the porous member is more easily depicted in FIG. 5, which is a cross-sectional view of the canister 26, although it should be understood that the following discussion is applicable to the other canister 28. The main sea water flow is through the porous member 36, from an outside surface 37 to an inside surface 39, as indicated by the arrows 52, and down through the hollow interior 41 of the porous member 36. As the sea water then flows through the porous member 36, particulate contaminants are then trapped against the outer surface 37 of the porous member 36. The filtered sea water exits into a main output 54 of the canister, as shown by the arrow 56. FIG. 4 is a bottom view of both canisters 26 and 28 and it shows the main output 54 of canister 26 and a main output 58 of canister 28 feeding into a common output manifold 60. Thus, sea water flow through the filter 520 is basically continuous.

When cleaning of the porous member 36 and 38 is required, as indicated by pressure drop across the filter 520 (as measured by a pressure transducer, not shown), the drive mechanisms 40 and 42 are activated to rotate the respective porous members. In addition, solenoid valves 72 and 74 (FIG. 3) are activated to open respective drains (only one 76 of which is shown in FIG. 5), located directly below the drain subchamber 50C, for diverting the particulate debris and a limited amount sea water down through a respective drain, rather than through the main outlets 54 and 58. Furthermore, it is within the broadest scope of this invention to include other alternative locations for the drain, e.g., along the chamber, rather than under it, as will be discussed in detail later. Opening of the drain 76 (or the alternative drain) is kept to a minimum to discard as little sea water as possible while flushing the particulate contaminants from the chamber. Thus, for example, the drain 76 can be open all or any part of the time that the porous members 36 and 38 are rotating.

Figure 7:
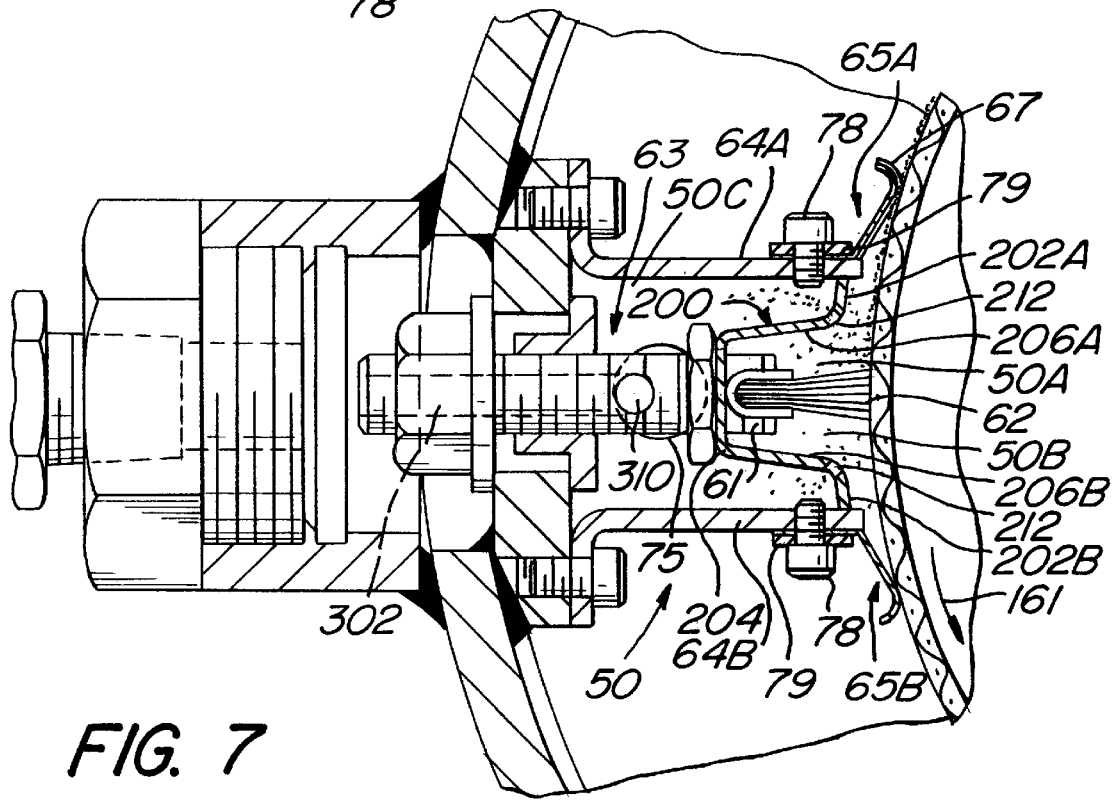
FIG. 7 is a partial sectional view taken along line 7—7 of FIG. 5.

Cleaning of the porous members 36 and 38 is accomplished by the particulate-removing means, only one of which is shown most clearly in FIGS. 5, 7, 8 and 9; as such, the following discussion applies to the particulate-removal means in the canister 28 also. In the preferred embodiment, the particulate-removing means comprises an elongated wire brush 62 that spans the length of the porous member 36. The brush fibers are in contact with the outside surface 37 of the porous screen 36 and thus bear on the outside surface 37 of the porous member 36 along its entire length. The brush 62 forms the separation between the two dislodge subchambers 50A and 50B, while the majority of a brush support 63 is disposed inside the drain subchamber 50C, as shown in FIG. 7.

As mentioned previously, the chamber 50 comprises the two dislodge subchambers 50A/50B and a drain subchamber 50C. The chamber 50 comprises a pair of confining walls 64A and 64B, also running the length of the porous member 36, that enclose the brush 62/brush support 63. The purpose of these walls 64A and 64B is to contain the dislodged particulate debris within the chamber 50 so that substantially only sea water within this chamber 50 will be discharged through the drain 76 (or alternative drain 300, to be discussed later) during cleaning. A partition 200, also running the length of the porous member 36, forms the separation between the two dislodge subchambers 50A/50B and the drain subchamber 50C. The partition 200 itself comprises a pair of outer flanges 202A/202B, a base wall 204 and sidewalls 206A/206B. The base wall 204 is secured between a particulate-removing means (e.g., brush 62 or scraper) head 61 and the particulate-removing means support 63. At the bend between the sidewalls 206A/206B and the outer flanges 202A/202B, the partition 200 comprises a plurality of apertures 212 (FIGS. 7, 9, 11 and 12) that permit the passage of dislodged particulate contaminants from the two dislodge subchambers 50A/50B to the drain subchamber 50C. Because of the size of the apertures 212 (e.g., 0.094" diameter), once any particulate contaminants from the two dislodge subchambers 50A/50B make their way through the partition 200, there is very little chance that such particulate contaminants can find their way back through the apertures 212 and ultimately return to the outer surface 37.

Figure 9:
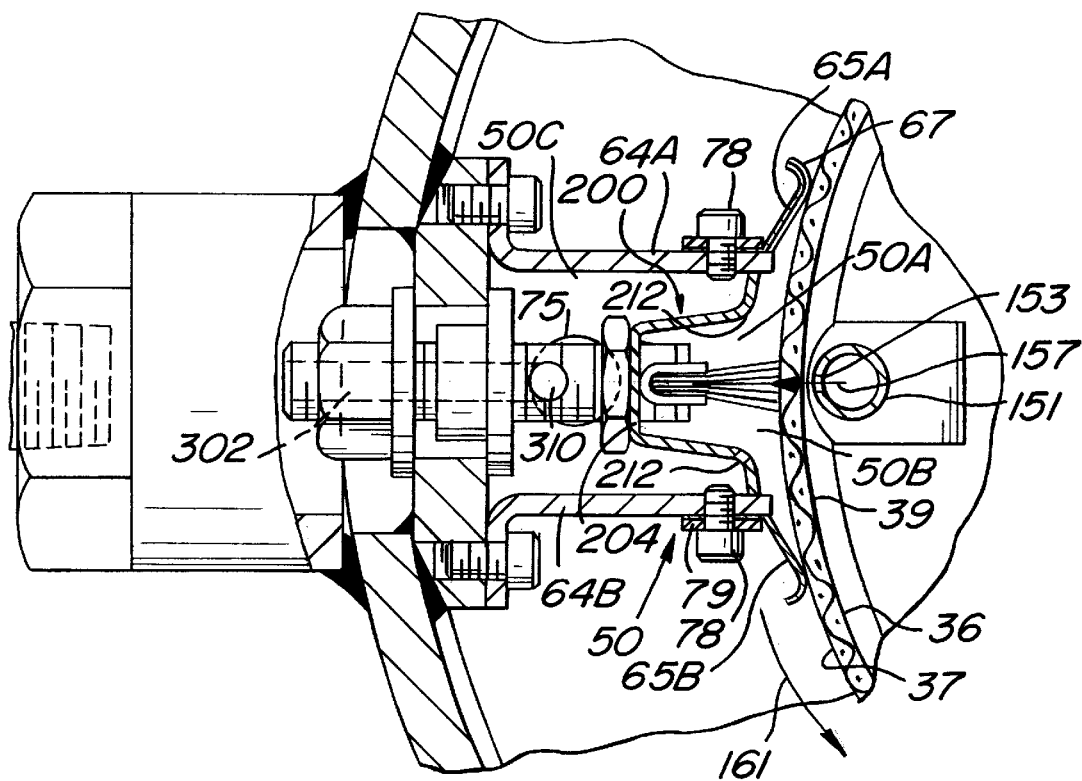
FIG. 9 is a partial sectional view taken along line 9—9 of FIG. 8.

A drain passageway 75, through a strainer support housing 77, is also shown in FIGS. 5. FIGS. 7 and 9 also show the passageway 75 in phantom.

Figure 13:
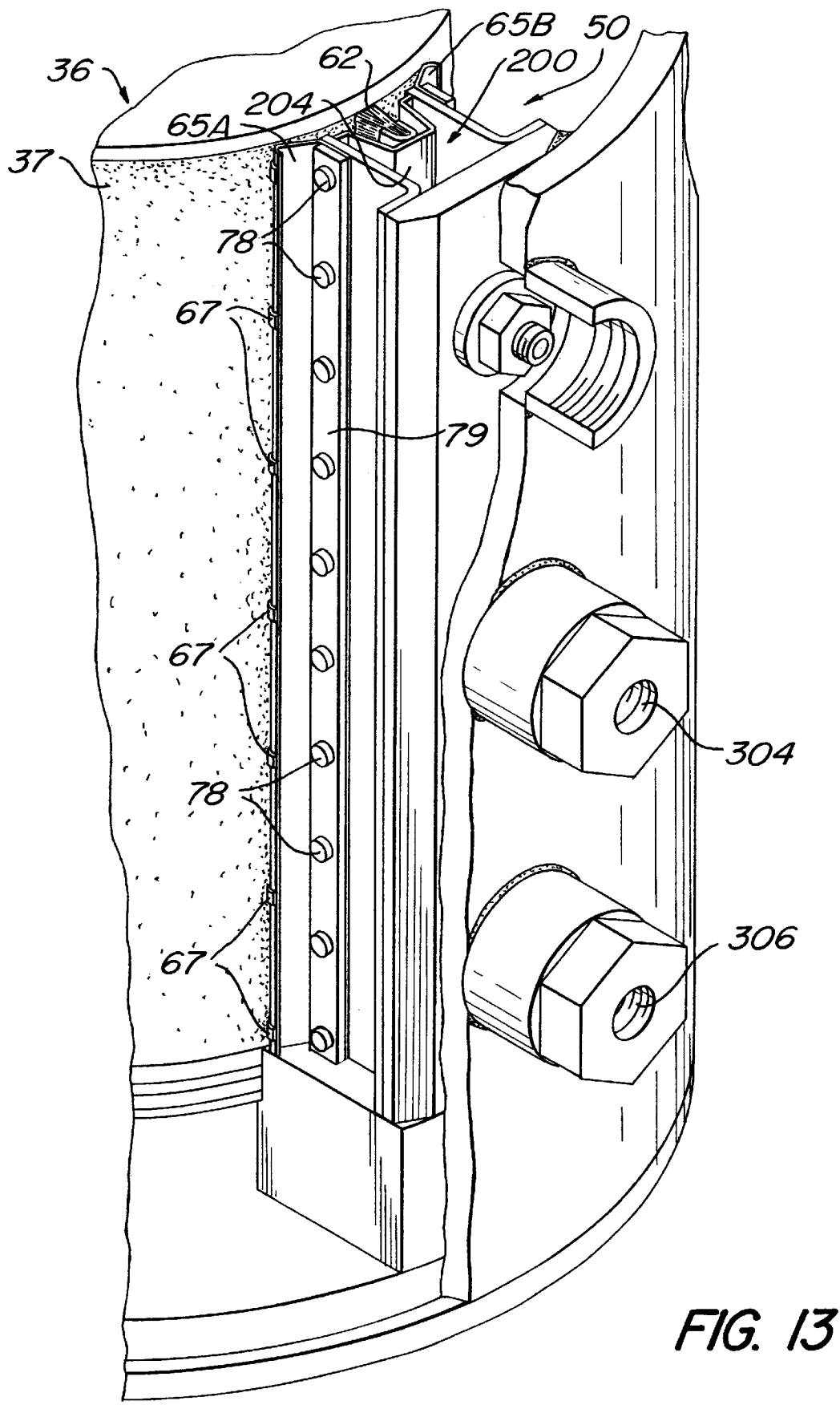
FIG. 13 is a partial isometric view of the internal particulate chamber depicting the partition and one of the wipers comprising the shoes.

At the extreme ends of the confining walls 64A and 64B, respective wipers 65A and 65B are secured to the outside surfaces of the walls 64A and 64B, respectively, and which also run the length of the porous member 36. The wipers 65A and 65B (e.g., 316 stainless steel, half-hard) are coupled to the ends of the walls 64A and 64B using fasteners 78 and plates 79. As can be seen most clearly in FIG. 13, wiper 65A comprises a plurality of spaced-apart shoes or runners 67 that are in contact with the outer surface 37 of the porous member 36. These shoes 67 (e.g., 0.010"–0.015" thickness and ¼" wide and which may be spot-welded to the wiper 65A) serve to maintain the wiper 65A a sufficient distance away from the outer surface 37 such that during cleaning, while the porous member 36 is rotating (direction of rotation is shown by the arrow 161 in FIG. 7), the particulate contaminants adhering to the outer surface 37 pass beneath the wiper 65A between the shoes and then are driven off of the outer surface 37 by the particulate-removing means 62 and into the dislodge subchamber 50A. The drain subchamber 50C is in direct fluid communication with the drain 76 (or alternative drain 300). When the drain 76 (or alternative drain 300) is open, any particulate contaminants suspended in the dislodge subchamber 50A are pulled toward the apertures 212 in the partition 200 and pass through them and out to the drain 76 (or 300).

Any remaining particulate contaminants which cannot be mechanically driven off of the surface 37 by the brush 62, e.g., particulate contaminants lodged in between the outer surface 37 and the inside surface 39 of the porous member 36 (e.g., lodged in the wedge wire cells of a porous member 36 comprising wedge wire), are subjected to a reverse pressure out of the surface 37 into the second 50B dislodge subchamber 50B. In particular, unlike the first dislodge subchamber 50A which is not totally closed off since the wiper 65A stands off from the outside surface 37 of the porous member 36, the second dislodge subchamber 50B forms a completely-closed off chamber because the wiper 65B does not include shoes and, therefore, is in contact with the outer surface 37 along its entire length. Thus, the second dislodge subchamber 50B is subjected completely to the influence of the pressure differential created between the inside surface 39 of the porous member 36 and the opened drain pressure which is present in the drain subchamber 50C, via the apertures 212. When the drain 76 (or 300) is open, these particulate contaminants, lodged in between the outer surface 37 and the inside surface 39 of the porous member 36, are driven out of that region by the reverse pressure differential and then are suspended in the second dislodge subchamber 50B; this pressure differential also pulls these particulate contaminants toward the apertures 212 in the partition 200 and into the drain subchamber 50C for passage through the drain 76 (or 300).

As pointed out earlier, the particulate contaminants are of an extremely small size, less than 100 microns, and a large percentage of these are less than 25 microns; as a result, these particulate contaminants do not settle out by gravity into the drain but rather, due to their small size, remain suspended in the sea water. The invention of the present application is well suited to overcome this problem as described below.

It should be understood that the apertures 212 provide for fluid communication between the first dislodge subchamber 50A and the drain subchamber 50C and for fluid communication between the second dislodge subchamber 50B and the drain subchamber 50C. However, because the apertures 212 are small, they maintain a high velocity of particulate contaminants from both the first and second dislodge subchambers 50A and 50B into the drain subchamber 50C under the influence of the reverse pressure differential. Such a high velocity cannot be sustained by replacing the apertures 212 with a slot. Furthermore, replacing the apertures 212 with a slot would defeat the purpose of maintaining the transferred particulate contaminants (i.e., particulate contaminants that have passed from the dislodge subchambers 50A/50B) in the drain chamber 50B since the particulate contaminants would not be precluded from making their way back to the outer surface 37 of the porous member 36.

In particular, the advantage of using the plurality of apertures, as opposed to a slot of the type shown in U.S. Pat. No. 5,595,655 (Steiner et al.), is that the plurality of apertures provides for a rapid flow velocity as opposed to a low flow velocity for the slot. For example, if there are 21 apertures that form one set of apertures in the partition 200, each having a diameter of approximately 0.094", then the total area is approximately $\pi(0.094"/2)^2 \times 21 = 0.1457$ in$^2$. If, on the other hand, a slot having a width of 0.094" and a length of 12.594" (i.e., the length from the top of the uppermost aperture in the partition 200 to the bottom-most aperture in the partition 200; this is a reasonable assumption since the Steiner et al. patent states that the slot is substantially equal to the scraper length-Steiner et al. patent, col. 1, lines 61–62) is used, the area is 1.184 in$^2$. Thus, using a plurality of apertures presents only ⅛ the area of the slot. As a result, for a given flow rate (gallons/minute), the slot may provide flow velocity of 1 ft/sec whereas the apertured partition generates a flow velocity of 8 ft/sec. The higher velocity significantly reduces the chance that a particulate will migrate backwards through the plurality of apertures and re-attach to the porous surface 36.

Figure 8:
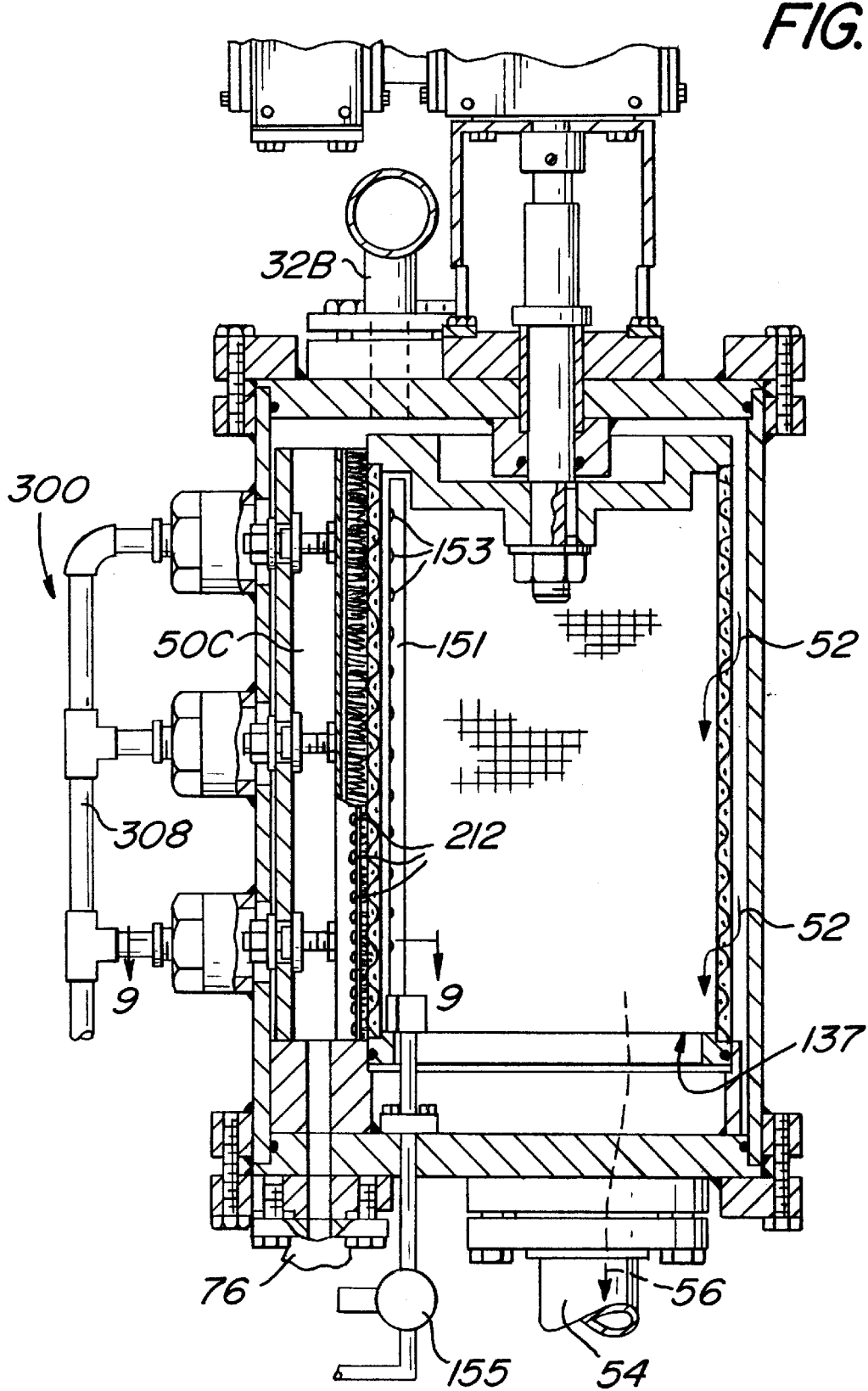
FIG. 8 is a cross-sectional view of the present invention using a reverse flow of clean water/salt water as part of the particulate-removing means.
Figure 12:
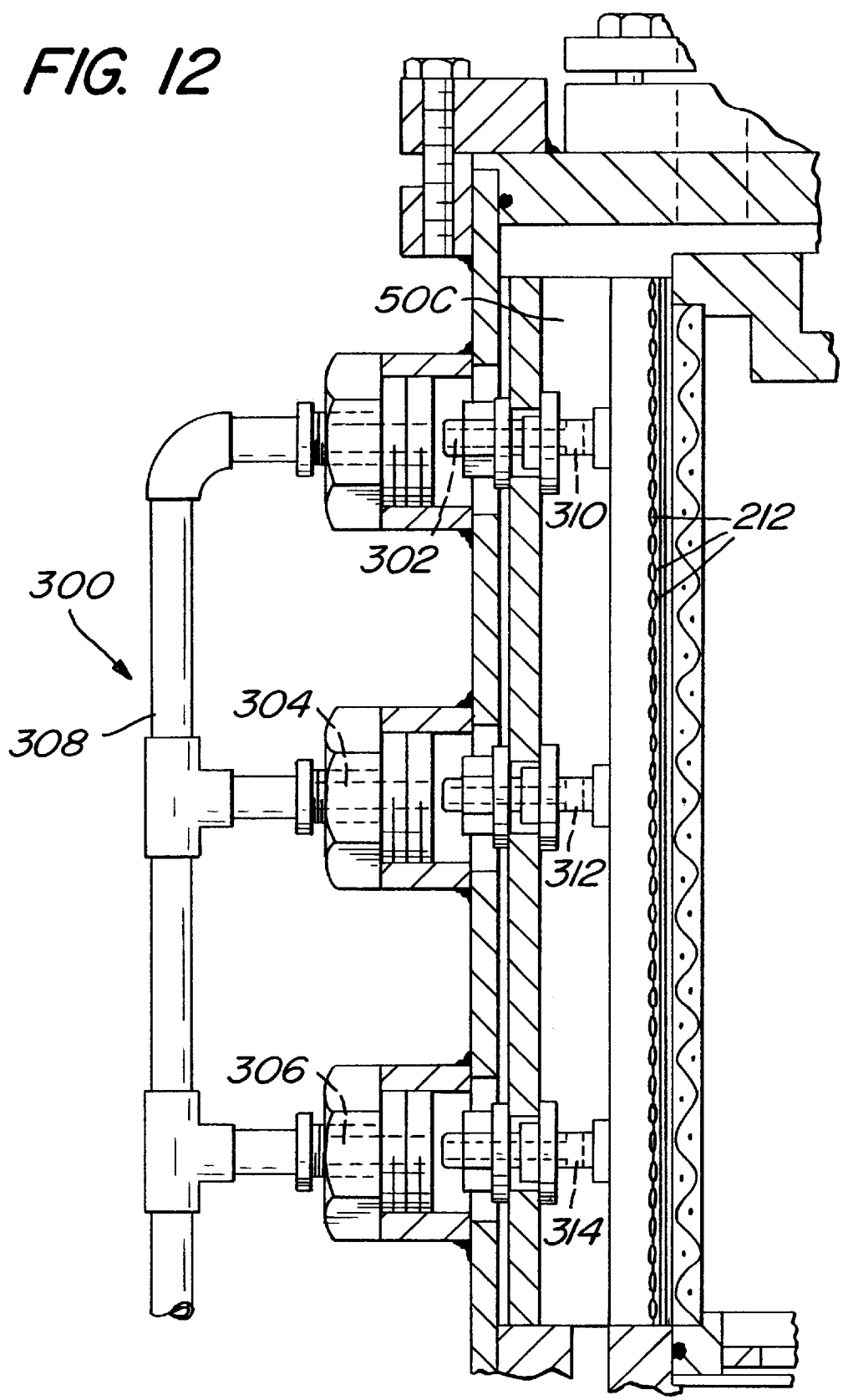
FIG. 12 is an enlarged, cross-sectional view of a portion of FIG. 5, depicting the passageways in the particulate-removing means support for use with the alternative drain configuration.

It is also within the broadest scope of the present invention to include an alternative drain 300 configuration as shown most clearly in FIGS. 5, 8 and 12. To that end, a drain 300 is depicted along side the drain subchamber 50C rather than disposed underneath the subchamber 50C, as discussed previously. The drain 300 comprises drain passageways 302, 304 and 306 that form a portion of the particulate-removing means support 63. The passageways 302–306 are coupled at one end to a common manifold 308 through which the dislodged particulate contaminants are disposed of. As shown in FIG. 12, the other end of each passageway 302–306 comprises a respective cross hole 310, 312, and 314 disposed in the drain subchamber 50B. Thus, when a drain solenoid valve 316 (FIG. 5) is activated as discussed previously, particulate matter that has been dislodged from the outer surface 37 of the porous members 36/38 into the two dislodge subchambers 50A/50B, passes through the apertures 212 in the partition 200 into the drain chamber 50B. From there, the dislodged particulate contaminants are driven into the cross holes 310–314, through the passageways 302–306 and then into the common manifold 308. Thus, particulate contaminants dislodged from the outer surface 37 of the porous members 36/38 would be driven into the alternative drain 300.

Alternatively, instead of using a single solenoid valve 316, it is within the broadest scope of this invention to include dedicated solenoid valves 318, 320 and 322 (FIG. 5) that individually couple respective passageways 302–306 to the common manifold 308.

It is also within the broadest scope of the present invention that the term particulate-removing means include a brush, a scraper, or any equivalent device that is used to dislodge particulate contaminants from the outside surface 37 of the porous members 36 and 38. For example, where larger particulate contaminants are to be filtered from the water flow, a scraper (not shown) can be used in place of the brush 62.

It is also within the broadest scope of the present invention that the particulate-removing means also encompasses a reverse flow of clean water for dislodging the particulate contaminants from the water filter 520; or a reverse flow of clean water in combination with the particulate-removing member (e.g., brush or scraper), discussed previously.

Figure 10:
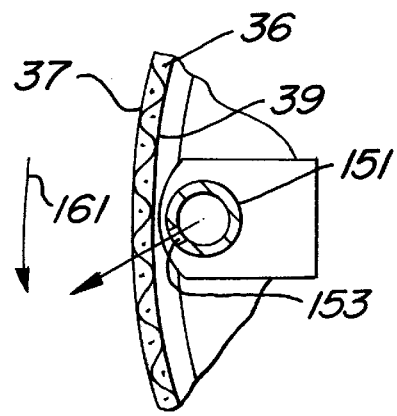
FIG. 10 is similar to FIG. 9 except that a different reverse flow direction is depicted.
Figure 11:
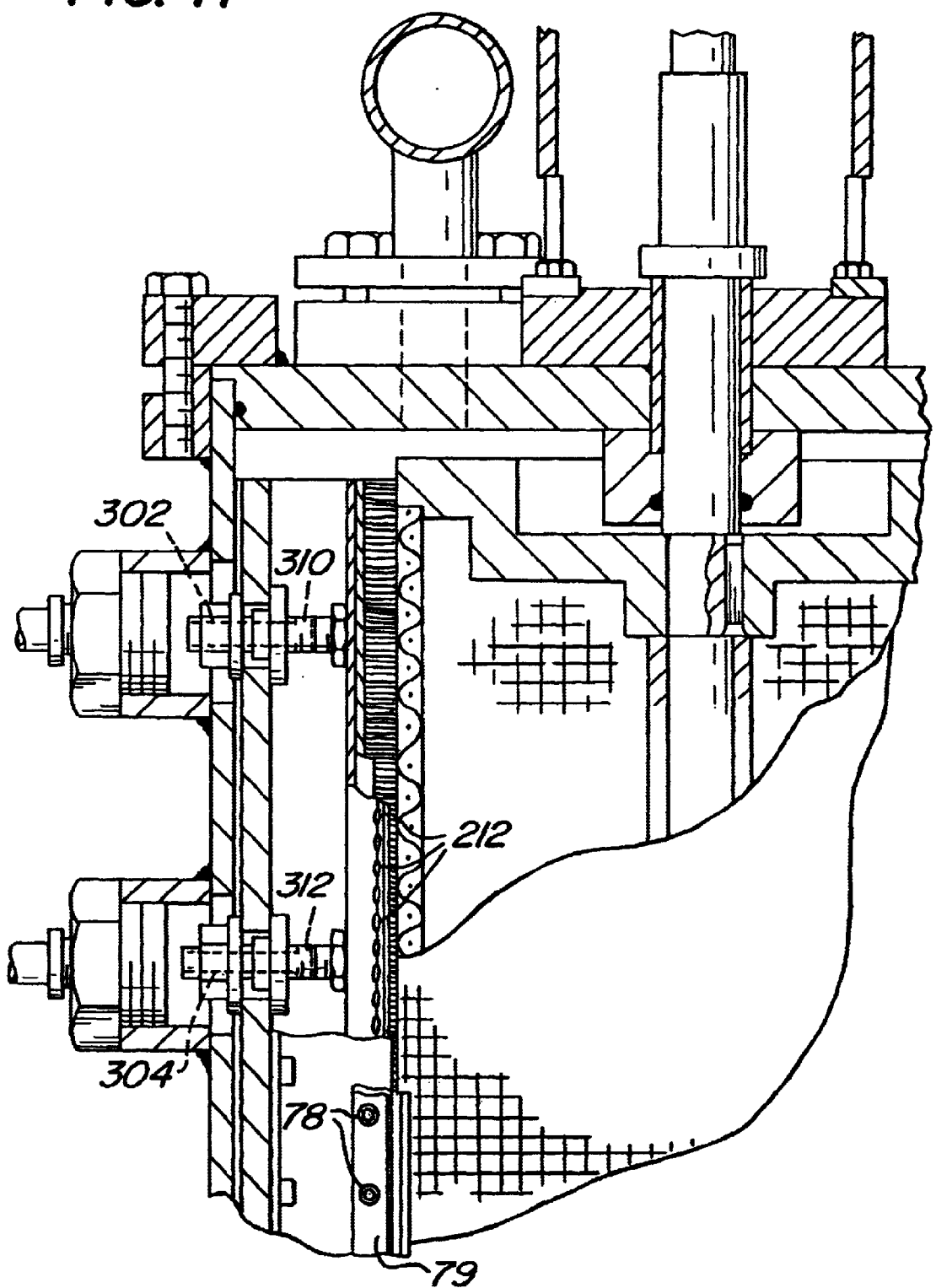
FIG. 11 is an enlarged, cross-sectional view of a portion of FIG. 5, depicting different portions of the partition and one of the associated wipers.

In particular, as shown in FIGS. 8–10, a second embodiment of the present invention comprises a particulate-removing means that includes an elongated spraying element 151 comprising a plurality of ports 153. The elongated spraying element 151 is coupled to a pressure source 155 (e.g., a pump, air supply, etc.) that recirculates clean water (whose flow is indicated by the arrow 56) into the elongated spraying element 151, during cleaning only, to create a high energy water spray that emanates from each of the ports 153. As shown most clearly in FIG. 9, the direction of the high energy spray (indicated by the arrow 157) is from the inside surface 39 to the outside surface 37 of the porous member 136. Thus, as the porous member 36 is rotated (direction indicated by the arrow 161) during cleaning, the high energy spray drives the particulate contaminants from the outside surface 39 into the dislodge subchamber 50B.

It should be understood that the particulate-removing means may comprise the elongated spraying element 151 alone for driving off the particulate contaminants, or the particulate-removing means may comprise a particulate-removing member (e.g., a brush 62 or scraper) in addition to the elongated spraying element 151, as shown in FIGS. 8–9. Together, the elongated spraying element 151 and the particulate-removing member (e.g., brush 62 or scraper) act to dislodge the particulate contaminants from the outside surface 37 of the porous member 36 during cleaning. When the particulate-removing member (e.g., a brush 62 or scraper) is used in combination with the elongated spraying element 151, the direction of the high energy spray (indicated by the arrow 163) may be set to occur after the particulate-removing member dislodges some of the particulate contaminants (FIG. 10), thereby driving particulate contaminants into the second dislodge subchamber 50B.

The porous member 36, for use in this second embodiment, comprises an open lower end 137 (FIG. 8) to permit passage of the elongated spraying element 151 therethrough.

Figure 14:
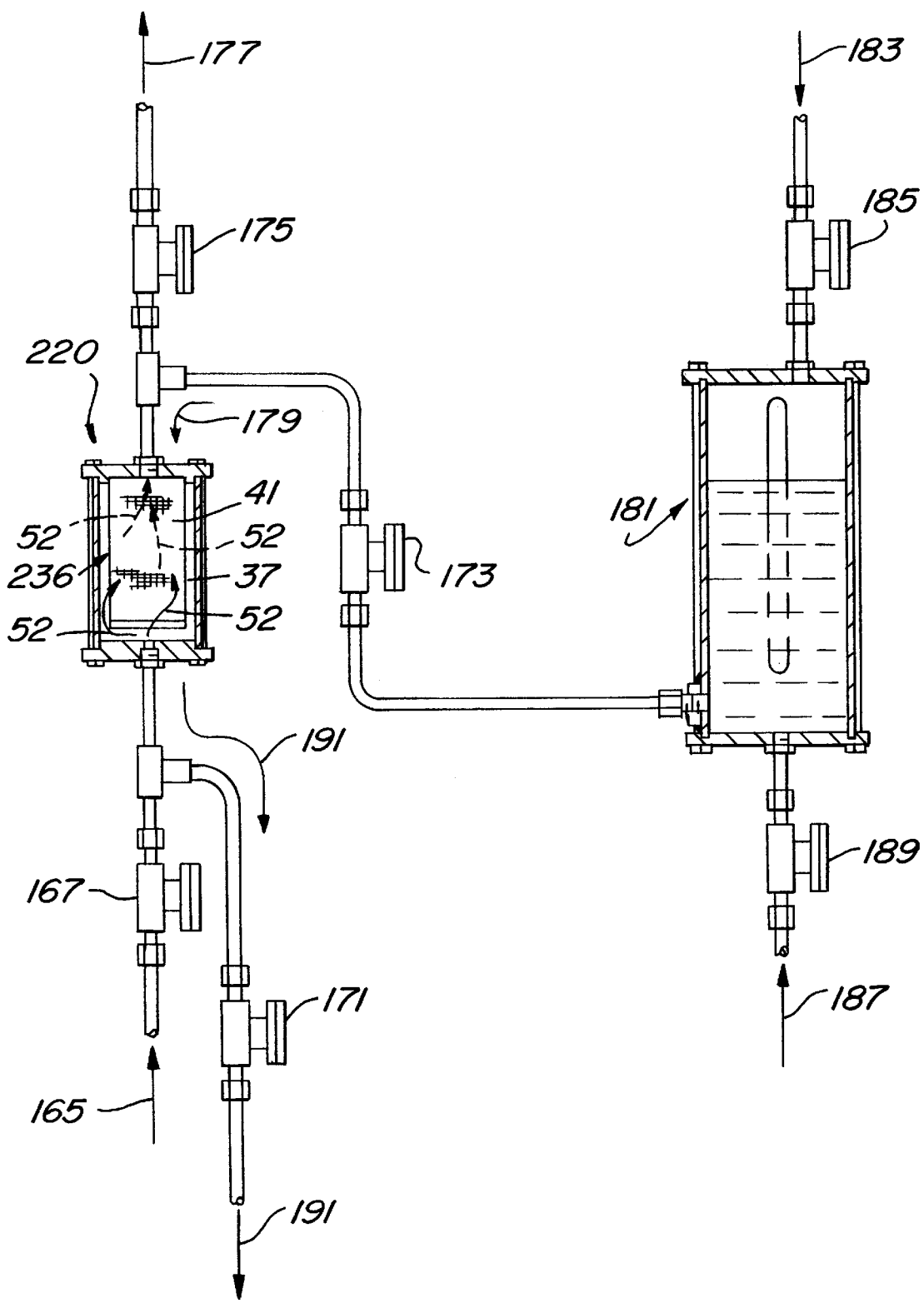
FIG. 14 is a schematic of a water/salt water cleaning system using a stationary water/salt water strainer.

Another variation of the self-cleaning water filter that utilizes a reverse flow of clean water for cleaning purposes is depicted at 220 in FIG. 14. In particular, as indicated by the arrow 165, during normal operation, sea water enters through an inlet valve 167 to a water filter 220. During normal operation, a drain valve 171 and a purge valve 173 remain closed, as will be discussed in detail later. The water filter 220 comprises a porous member 236, preferably having a wire cloth configuration. The direction of the main sea water flow through the porous member 236 is given by the arrows 52 and is similar to the flow for the porous members discussed previously, i.e., from an outside surface 37 of the porous member 236 to an inside surface (not shown) of the porous member 236 and then through the center portion 41 of the porous member 236. The cleaned sea water is then passed through an outlet valve 175 in the direction of the arrow 177.

The cleaning process for the water filter 220 is different from the previous embodiments in that the porous member 236 does not move during cleaning. Instead, a reverse flow of clean water (the direction of this reverse flow is given by the arrow 179) is injected down through the center of the porous member 236, from the inside surface to the outside surface 37 of the porous member 236. This reverse flow of clean water impacts the entire inside surface of the porous member 236 and flows to the outside surface 37 of the porous member 236, thereby dislodging the particulate contaminants from the outside surface 37 of the porous member 236. Since this reverse flow acts through the entire porous member 236, there are no confining walls used. Thus, in this embodiment, the particulate removal means comprises only the reverse flow of clean water. Because this reverse flow of clean water is applied through the entire porous member 236, the water filter 220 must be isolated from the normal sea water flow during cleaning, as will be discussed in detail below.

In particular, when cleaning is required, the inlet valve 167 and outlet valve 175 are closed and the purge valve 173 and drain valve 171 are opened. The purge valve 173 is coupled to a clean water reservoir 181 which is under pressure (e.g., an air supply, whose input flow is indicated by the arrow 183 and having a valve 185 for maintaining air pressure in the reservoir 181. The downstream clean water, indicated by the arrow 187, enters the reservoir 181 through a recharge valve 189). When the purge valve 173 and the drain valve are opened, the reverse flow of clean water 179 drives the particulate contaminants off of the outside surface 37 of the porous member 236; this reverse flow, now containing the dislodged particulate contaminants, flows out, as indicated by the arrow 191, through the drain valve 171. Once this flow of dislodged particulate contaminants passes to the drain, the purge valve 173 and the drain valve 171 are closed and the input valve 167 and the output valve 175 are opened, restoring normal sea water flow.

It should be understood that the continuous sea water flow is accomplished by having a plurality (e.g., five to eight) parallel, non-rotating filter paths (not shown) that are coupled to the reservoir 181 through respective purge valves 173. Thus, when any one non-rotation filter path is being cleaned using the reverse water flow, the remaining parallel channels are operating under the normal sea water flow.

Figure 15:
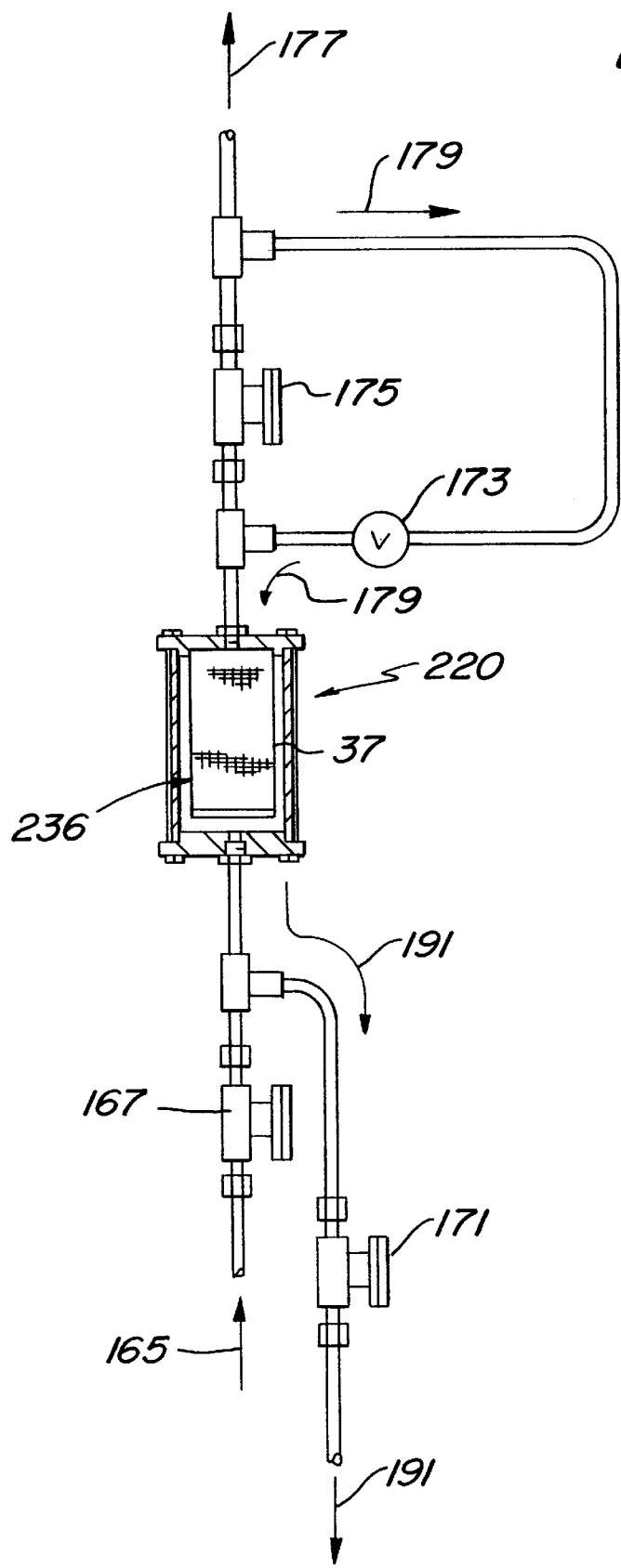
FIG. 15 is a variation of the water/salt water cleaning system of FIG. 14 wherein the downline water/salt water flow is used as the source of the reverse clean water/salt water flow.

Another variation of this embodiment, depicted in FIG. 15, uses the downstream clean water directly to create the reverse water flow. In particular, the purge valve 173 is coupled directly to the downstream clean water flow. The sequence of valve openings/closings are similar to that described previously. Thus, when the purge valve 173 and the drain valve 171 are opened a pressure differential is created and the reverse flow of clean water, the direction indicated by the arrow 179, is generated directly from the downstream clean water flow.

Figure 16:
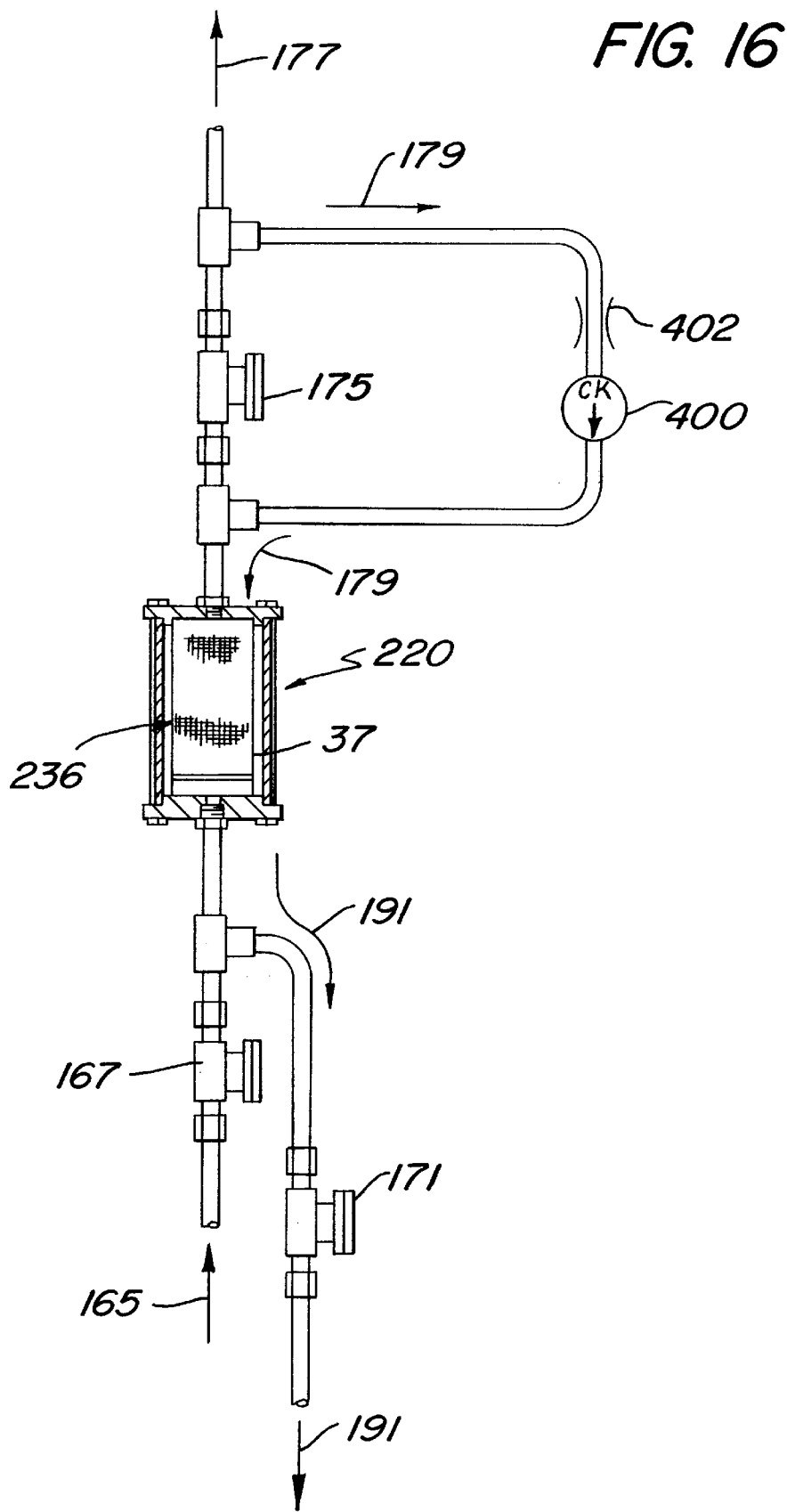
FIG. 16 is another variation of the invention of FIG. 15.

Another variation of this embodiment is shown in FIG. 16 that uses passive components such as a check valve 400 and a flow restricting orifice 402 in place of the purge valve 173.

It should also be understood that the variations of FIGS. 15 and 16, like that discussed with regard to FIG. 14, also comprise a plurality of parallel, non-rotating filter paths that permit the continuous flow of sea water when any one of the parallel, non-rotating filter paths is being cleaned by the reverse flow of clean water.

Figure 17:
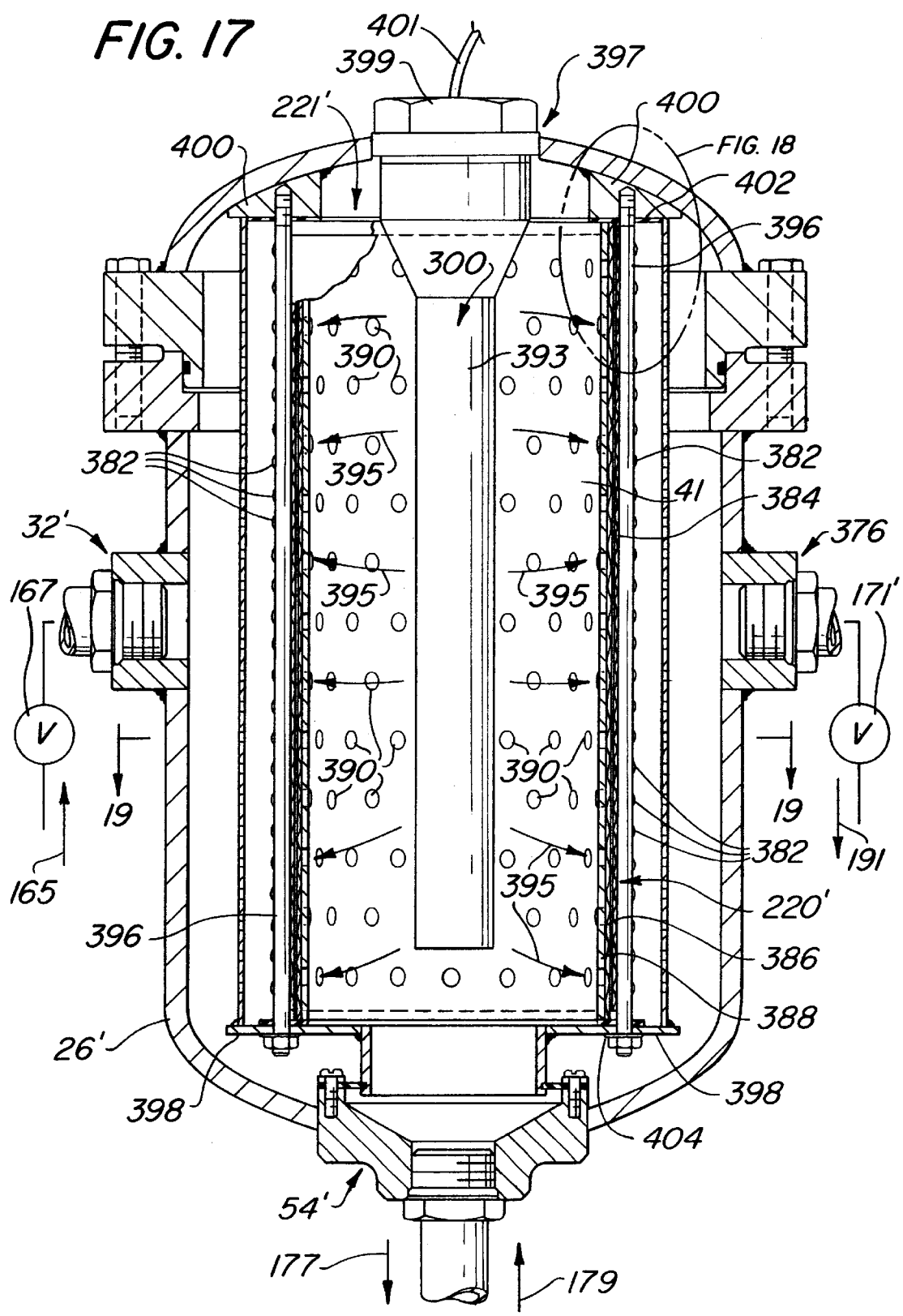
FIG. 17 is a cross-sectional view of a stationary filter, that can be used in the systems shown in FIGS. 14–16, and having an ultrasonic generator disposed therein.
Figure 18:
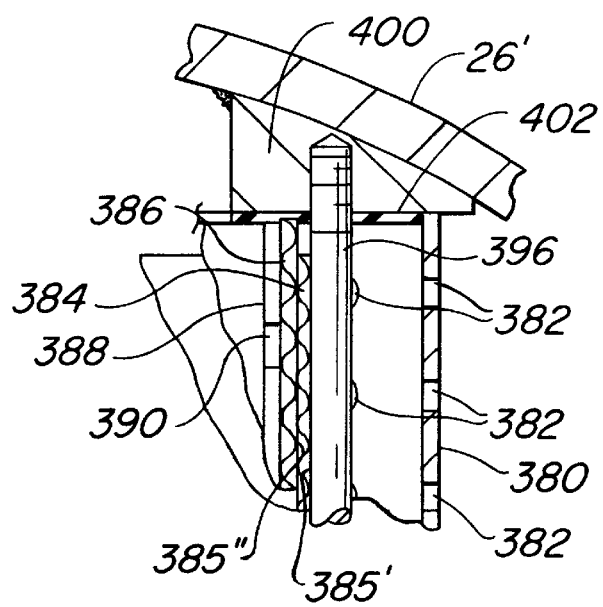
FIG. 18 is an enlarged view of the circled portion shown in FIG. 17.
Figure 19:
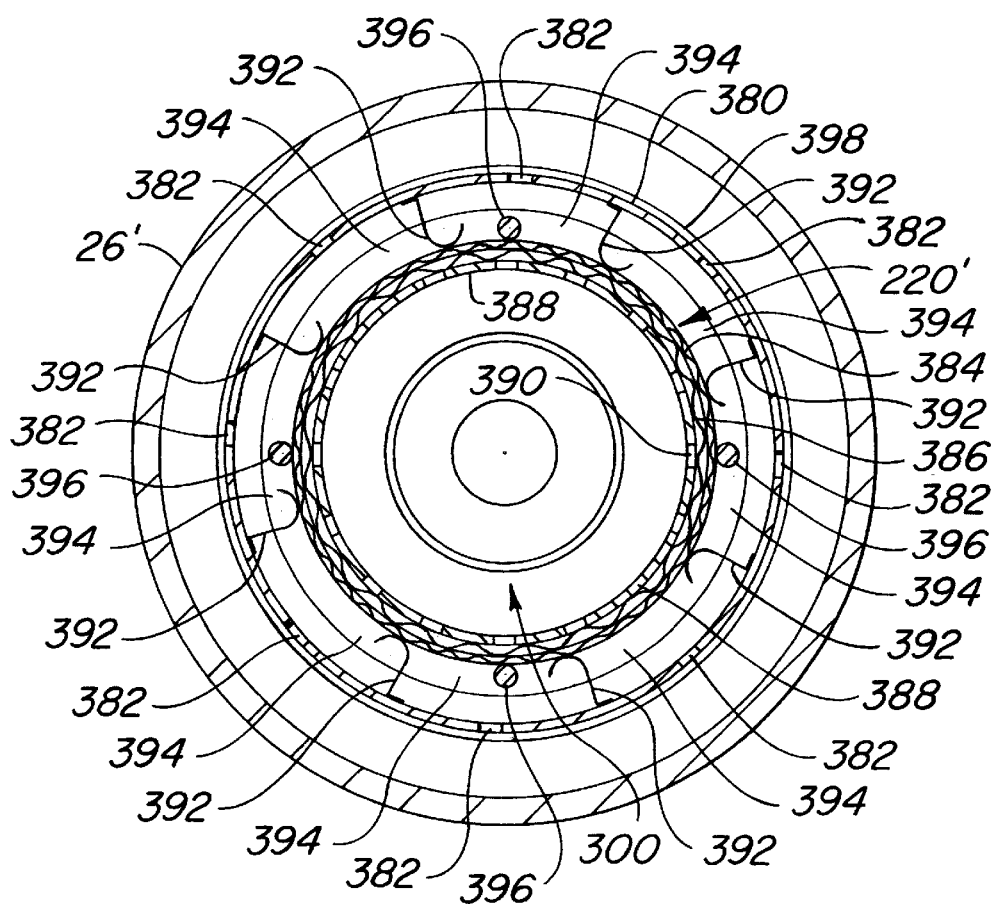
FIG. 19 is a sectional view of the stationary filter taken along line 19—19 of FIG. 17.

FIGS. 17–19 depict an exemplary station filter 220', having an ultrasonic generator 300 disposed therein, that can be used in the systems shown in FIGS. 14–16 and, more preferably, to the systems of FIGS. 15–16.

Before proceeding with a discussion of FIGS. 17–19, it should be understood that in FIGS. 14–16, the input flow 165 is shown in an upward direction from the bottom of the page toward the outlet flow 177 shown at the top of the page, for clarity only. The actual flow of any of the systems shown in FIGS. 14–16 is exemplary only and may be in any number of directions and, therefore, is not limited to those depicted in those figures. Thus, the orientation of the stationary filter 220' shown in FIGS. 17–19 is simply inverted from that shown in FIGS. 14–16. Thus, the "top surface" 221' in FIG. 17 corresponds to the "bottom" surface 221 shown in FIGS. 14–16.

As will also be discussed in detail later, the input line into the stationary filter 220' is from the side of the canister 26', at an input port 32', rather than from the "bottom" surface 221 shown in FIGS. 14–16; the reason for this will also be discussed later. In addition, a dedicated drain port 376 passes the dislodged particulate contaminants away from the stationary filter 220' to a drain (not shown). Because of these port configurations, the input tee 291 in the systems of FIGS. 14–16 is eliminated.

As shown in FIG. 17, the stationary filter 220' is housed in the canister 26'. On one side of the canister 26' is the input port 32' while on the other side of the canister 26' is the drain port 376; at the bottom of the canister 26' is an output port 54'. The ultrasonic generator 300 is disposed inside the hollow interior 41 of the stationary filter 220'. The inlet valve 167 is coupled to the port 32' and the drain valve 171' is coupled to the drain port 376. The valves 167/171' and the ultrasonic generator 300 are operated by a controller (not shown) during the cleaning process of the stationary filter 220' itself, as will be discussed later.

As shown most clearly in FIG. 19, the stationary filter 220' is positioned inside a chamber formed by a circular wall 380. The wall 380 comprises a plurality of sets (e.g., eight) of vertically-aligned holes (e.g., ¼" diameter) dispersed around the circular wall 380 (see FIG. 17); one hole 382 of each of the plurality of vertically-aligned holes is shown in FIG. 19. As will be discussed in detail later, the circular wall 380 acts to minimize the effects of the high velocity particulate-contaminated input flow 165, as well as to deflect and disperse the flow 165 all around the stationary filter 220'.

The stationary filter 220' comprises three parts: (1) an outer wire cloth layer 384 (e.g., 5 microns); (2) an inner 40–50 mesh layer 386; and (3) an inner perforated metal enclosure 388 (e.g., 16–18 gauge, stainless steel) all of which are microwelded together. The perforated metal enclosure 388 comprises staggered holes 390 (e.g., ¼" diameter, see FIG. 17) that results in an overall surface area that is approximately 50–60% open. The outer wire cloth layer 384 filters out the particulate contaminants of incoming water/salt water flow that passes through the holes 382 in the circular wall 380; in particular, as the incoming water/salt water flow 165 passes through an outer surface 385' (see FIG. 18) of the wire cloth layer 384 to an inner surface 385" of the wire cloth layer 384, the particulate contaminants lodge against the outer surface 385'. The 40–50 mesh layer 386 disperses the cleaned input flow around the periphery of the perforated metal enclosure 388 and through all of the holes 390 therein. The cleaned water/salt water flow then flows downward through the hollow interior 41 of the stationary filter 220' and through the output port 54'.

Although not shown, another version of the stationary filter 220' comprises only two parts: (1) an outer wire cloth layer (e.g., 5–20 microns) directly over a wedge wire inner layer with 5/16 inch slot openings between the turns of wedge wire. Advantages of this second version of the stationary filter 220' are that it allows a 90% open area as well as more direct contact with the backwash flow and the ultrasonic waves.

As can also be seen most clearly in FIG. 19, several continuous support members 392 are disposed between the outer wire cloth layer 384 of the stationary filter 220' and the circular wall 380. These continuous support members 392 form independent sectors 394 (e.g., eight, FIG. 19) around the periphery of the wire cloth layer 384. As mentioned earlier, during normal sea water flow, the effects of the high velocity particulate-contaminated input flow 165 are minimized by the presence of the circular wall 380 and the sectorization formed by the continuous support members 394; these sectors 394 segment the input flow 165 so that the input flow 165 impacts the wire cloth layer 384 around the entire stationary filter 220'. In particular, once the particulate-contaminated input flow 165 in each sector 394 passes through the vertically-aligned apertures 382, the input flow 165 encounters the outer surface 385' of the wire cloth layer 384 which traps the particulate contaminants therein. As also mentioned earlier, the cleaned water then passes through the 40–50 mesh layer 386 which disperses the cleaned input flow around the periphery of the perforated metal enclosure 388 and through all of the holes 390 therein. The cleaned water flow then flows downward through the hollow interior 41 of the stationary filter 220' and through the output port 54'

The stationary filter 220' is releasably secured inside the canister 26' using four tie bars 396 (FIG. 19) that couple between a lower baseplate 398 and an upper securement surface 400. To properly seal the stationary filter 220' inside the canister 26' an upper annular seal 402 (e.g., rubber, see FIG. 18) and a lower annular seal 404 (e.g., rubber) are used.

The ultrasonic generator 300 (e.g., the Tube Resonator RS-36-30-X, 35 kHz manufactured by Telsonic USA of Bridgeport, N.J.) is releasably mounted in the hollow interior 41 of the stationary filter 220'. In particular, an elongated housing 393 of the ultrasonic generator 300 is suspended in the hollow interior 41 of the stationary filter 220'. Thus, when the reverse flow of clean water/salt water 179 occupies the hollow interior 41, the ultrasonic generator 300 is energized wherein the ultrasonic energy is applied to the wire cloth layer 384 in the direction shown by the arrows 395 through the holes 390. The elongated housing 393 is attached to an electrical connector 397 which forms the upper portion of the ultrasonic generator 300. The electrical connector 397 is then releasably secured to the canister 26' (e.g., a nut 399). A wire harness 401 provides the electrical connection to the ultrasonic generator 300 from the controller (not shown). In this configuration, it can be appreciated by one skilled in the art, that the ultrasonic generator 300 and stationary filter 220' can be installed/replaced rather easily without the need to disconnect any plumbing from the input port 32', output port 54' or drain port 376.

During normal operation, the inlet valve 167 is open and the drain valve 171' is closed, thereby allowing the contaminated water/salt water flow 165 to be cleaned by the stationary filter 220' as discussed above. When the stationary filter 220' itself is to be cleaned, the controller (not shown) closes the inlet valve 167 while opening the drain valve 171'. As a result, a high pressure reverse flow 179 of clean water flows from the output port 54' and through the three-part stationary filter 220' and out through the drain port 376. As this reverse flow 179 passes through the wire cloth layer 384, the particulate contaminants are dislodged from the outer surface 385" of the wire cloth layer 384 and then driven out through the drain port 376. It should be noted that during this high pressure reverse flow 179, the continuous support members 392 also act to prevent the wire cloth layer 384 from separating from under laying support. The reverse flow 179 is applied for a short duration (e.g., approximately 4–5 seconds).

At the end of this application, and while there is still clean water in the hollow interior 41 but where the flow 179 is simply migrating (e.g., movement of clean water in inches/minute) rather than flowing, the controller (not shown) activates the ultrasonic generator 300 for a longer duration (e.g., 30 seconds to a couple of minutes) to provide for further cleaning of the wire cloth layer 384 by using ultrasonic energy to dislodge any remaining particulate contaminants in the wire cloth layer 384 into the migrating water flow and out through the drain port 376.

Without further elaboration, the foregoing will so fully illustrate our invention and others may, by applying current or future knowledge, readily adapt the same for use under various conditions of service.

We claim:

1. A water filter disposed within a water flow having particulate contaminants therein, said water filter comprising:
    a porous member in fluid communication with the water flow such that the water flow enters said porous member through a first porous member surface and exits through a second porous member surface, said water flow depositing the particulate contaminants on said first porous member surface;
    particulate-removing means disposed to be in close proximity with said porous member for removing particulate contaminants from said first porous member surface along substantially the entirety of the length of said first porous member surface;
    a pair of flow confining walls disposed to be in close proximity with said first porous member surface along substantially the entirety of the length of said first porous member surface for defining a chamber;
    a partition dividing said chamber into a first subchamber and a second subchamber along the length of said chamber;
    a drive mechanism for displacing said porous member for continuously directing particulate contaminants deposited on said first porous surface past the particulate removing means for continuously dislodging the particulate contaminants from said first porous member surface into said first subchamber;
    said partition including first and second portions on opposite sides of said particulate removing means and each portion having a plurality of apertures for passing the dislodged particulate contaminants from said first subchamber into said second subchamber; and
    a drain being in communication with said second subchamber and through which the dislodged particulate contaminants are removed when said drain is opened.

2. The water filter of claim 1 wherein said plurality of apertures are of sufficient area to generate a rapid velocity of dislodged particulates from said first subchamber into said second subchamber and wherein when said drain is opened a drain flow is created and wherein said plurality of apertures are linearly arranged to define an effective aperture length and wherein each aperture comprises a diameter, said rapid velocity of dislodged particulate contaminants being approximately eight times a velocity of dislodged particulate contaminants established by a slot having said effective aperture length and a width comprising said diameter for a given drain flow.

3. The water filter of claim 1 wherein said particulate removing means comprises a brush or scraper closely adjacent said first porous member surface and wherein said first subchamber is divided into a first dislodge subchamber and a second dislodge subchamber by said brush or scraper and wherein:
    said first dislodge chamber is formed between said first porous member surface, one of said confining walls, said brush or scraper, said partition and a first flexible member disposed between said one of said confining walls and said first porous member surface; and
    said second dislodge chamber is formed between said first porous member surface, the other of said confining walls, said brush or scraper, said partition and a second flexible member that is disposed between said other of said confining walls and said first porous member surface.

4. The water filter of claim 3 where said first flexible member comprises a plurality of shoes that are in contact with said first porous member surface for disposing said first flexible member closely adjacent said first porous member surface.

5. The water filter of claim 4 wherein said first flexible member is disposed away from said first porous member surface in the range of 0.010 inches to 0.015 inches.

6. The water filter of claim 1 wherein said particulate-removing means comprises a spraying element positioned closely adjacent said second porous member surface and opposite said pair of confining walls for generating a reverse flow of clean water, said reverse flow being directed from said second porous member surface through said first porous member surface for dislodging the particulate contaminants away from said first porous member surface into said first subchamber.

7. The water filter of claim 6 wherein said spraying element comprises an elongated lumen comprising a plurality of ports and coupled to a pressure source of clean water.

8. The water filter of claim 1 wherein said porous member comprises a cylindrical-shaped filter and wherein said first porous member surface is the outer surface of said cylindrical-shaped filter and wherein said second porous member surface is the inner surface of said cylindrical-shaped filter.

9. The water filter of claim 8 wherein said cylindrical-shaped filter screen comprises a screen selected from the group consisting of wedge wire, wire cloth and perforated metal.

10. The water filter of claim 9 wherein said cylindrical-shaped filter screen comprises a wedge wire configuration for trapping particulate contaminants.

11. The water filter of claim 10 wherein said cylindrical-shaped filter screen comprises a wedge wire configuration for trapping particulate contaminants as small as approximately 25 microns.

12. The water filter of claim 8 wherein said drive mechanism displaces said filter by causing it to rotate.

13. The water filter of claim 12 wherein said confining walls comprise respective outer surfaces away from said member and wherein said fluid communication comprises a first input water flow and a second input water flow on a respective outer surface away from said member.

14. The water filter of claim 1 wherein said particulate removing means comprises a brush or scraper and wherein said drain comprises:
   a plurality of particulate-removing means supports that include respective internal passageways that are in fluid communication with said second subchamber;
   a common manifold to which said respective internal passageways are coupled; and
   a drain valve coupled to said common manifold for controlling the opening and closing of said drain.

15. The water filter of claim 1 wherein said particulate removing means comprises a brush or scraper and wherein said drain comprises:
   a plurality of brush or scraper supports that include respective internal passageways that are in fluid communication with said second subchamber;
   a respective passageway valve coupled to each passageway for controlling the passage of particulate contaminants through said respective passageway; and
   a common manifold coupled to said respective passageway valves for conveying particulate contaminants out of said passageways.

16. The water filter of claim 1 wherein said porous member traps particulate contaminants as small as approximately 25 microns.

17. The water filter of claim 16 wherein said porous member comprises a screen selected from the group consisting of wedge wire, wire cloth and perforated metal.

18. The water filter of claim 1 wherein the water flow is a flow of sea water.

19. A method for cleaning a water flow having particulate contaminants therein, said method comprising the steps of:
   disposing a porous member in fluid communication with the water flow such that the water flow enters said porous member through a first porous member surface and exits through a second porous member surface so that the water flow deposits the particulate contaminants on said first porous member surface;
   positioning a pair of flow confining walls adjacent said first porous member surface to define a chamber and positioning a respective flexible member between a respective flow confining wall and said first porous surface member, said respective flexible members being in contact with said first porous surface;
   positioning a particulate-removing means closely-adjacent said porous member;
   dividing said chamber into first and second subchambers with a partition having first and second portions on opposite sides of said particulate removing means and each portion having a plurality of apertures to provide fluid communication between said first and second subchambers, said second subchamber being in fluid communication with a drain when the drain is opened;
   displacing said porous member to permit said particulate-removing means to dislodge particulate contaminants trapped on said first porous member surface into said first subchamber; and
   opening the drain to cause the dislodged particulate contaminants to pass through said plurality of apertures into said second subchamber and out into the drain.

20. The method of claim 19 wherein one of said respective flexible members is positioned to be in contact with said first porous member surface at discrete locations.

21. The method of claim 20 wherein said step of displacing said porous member comprises displacing said first porous member surface transversely in front of said particulate-removing means in a first direction, said first porous member surface passing said one of said respective flexible members that is in contact with said first porous member surface at discrete locations before passing in front of said particulate-removing means.

22. The method of claim 19 wherein said particulate removing means comprises a brush or scraper positioned closely adjacent said first porous member surface.

23. The method of claim 19 wherein said particulate removing means comprises a spraying element positioned closely adjacent said second porous member surface opposite said pair of confining walls for generating a reverse flow of clean water, said reverse flow being directed from said second porous member surface through said first porous member surface for dislodging the particulate contaminants away from said first porous surface into said first subchamber.

24. The method of claim 19 wherein the water flow is a flow of sea water.

* * * * *